United States Patent
Tay et al.

(10) Patent No.: US 10,594,397 B2
(45) Date of Patent: *Mar. 17, 2020

(54) METHOD, APPARATUS AND SYSTEM FOR VISIBLE LIGHT COMMUNICATION

(71) Applicant: Corning Research & Development Corporation, Corning, NY (US)

(72) Inventors: Kar Yam Tay, Singapore (SG); Anne-Maud B. Laprais, Paris (FR); Andrew Timothy Tio, Singapore (SG)

(73) Assignee: Corning Research & Development Corporation, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/025,388

(22) Filed: Jul. 2, 2018

(65) Prior Publication Data
US 2018/0309514 A1  Oct. 25, 2018

Related U.S. Application Data

(63) Continuation of application No. 15/117,499, filed as application No. PCT/US2015/011675 on Jan. 16, 2015, now Pat. No. 10,014,940.
(Continued)

(51) Int. Cl.
*H04B 10/00* (2013.01)
*H04B 10/116* (2013.01)
*H04B 10/114* (2013.01)

(52) U.S. Cl.
CPC ....... *H04B 10/116* (2013.01); *H04B 10/1141* (2013.01)

(58) Field of Classification Search
CPC .............. H04B 10/116; H04B 10/1141; H04B 10/612; H04B 10/676
(Continued)

(56) References Cited

U.S. PATENT DOCUMENTS 10,014,940 B2 * 7/2018 Tay .................... H04B 10/1141
2005/0248471 A1  11/2005 Ryu
(Continued)

FOREIGN PATENT DOCUMENTS

EP        2164190        3/2010
KR    1020130085527      7/2013

OTHER PUBLICATIONS

International Search Report for PCT International Application No. PCT/US2015/011675 dated Apr. 13, 2015, 3 pages.
(Continued)

*Primary Examiner* — Mohammad R Sedighian
(74) *Attorney, Agent, or Firm* — Withrow & Terranova, P.L.L.C.

(57) ABSTRACT

There is provided a method of transmitting a visible light signal in visible light communication, including binarizing data to be transmitted into a binary bit representation, encoding the data for transmission by modulating one or more of a plurality of light emitting regions between a first state and a second state based on the binary bit representation of the data, and transmitting the visible light signal in the form of light emitted by one or more of the plurality of modulated light emitting regions, the visible light signal being decodable to obtain the data. There is also provided a method of transmitting a visible light signal in visible light communication which includes modulating one or more second sets of light emitting regions within the capture region between a first state and a second state based on the bit representations of one or more previous data for enabling error detection. Corresponding methods of receiving a visible light signal and systems are also provided.

19 Claims, 39 Drawing Sheets

Related U.S. Application Data

(60) Provisional application No. 61/942,838, filed on Feb. 21, 2014.

(58) Field of Classification Search
USPC .......................................................... 398/118
See application file for complete search history.

(56) References Cited

U.S. PATENT DOCUMENTS

| | | |
|---|---|---|
| 2007/0038987 A1 | 2/2007 | Ohara |
| 2007/0058987 A1* | 3/2007 | Suzuki ............... H04B 10/1141 398/183 |
| 2011/0038638 A1 | 2/2011 | Son |
| 2012/0113498 A1* | 5/2012 | Margerm ............. G09G 3/3426 359/290 |
| 2013/0027423 A1 | 1/2013 | Bae |
| 2013/0308954 A1 | 11/2013 | Lee |
| 2014/0086587 A1* | 3/2014 | Roberts ................ H04B 10/116 398/115 |

OTHER PUBLICATIONS

Khan, "Visible Light Communication using Wavelength Division Multiplexing for SmartSpaces", The 9th Annual IEEE Consumer Communications and Networking Conference—Smart Spaces and Personal Area Networks, 2012, pp. 230-234.

Kishino, "Realizing a Visual Marker using LED's for Wearable ComputingEnvironment", Proceedings of the 23rd International Conference on DistributedComputing Systems Workshops, 2003, pp. 314-319.

* cited by examiner

| ASCII | Hexadecimal | Binary | Display |
|---|---|---|---|
| H | 48 | 0100 1000 | Focus Area: LB, DB |
| e | 65 | 0110 0101 | Focus Area: LB, P, G, GY |
| l | 6C | 0110 1100 | Focus Area: LB, P, DB, G |
| l | 6C | 0110 1100 | Focus Area: LB, P, DB, G |
| o | 6F | 0110 1111 | Focus Area: LB, P, DB, G, R, GY |

| Number of lit LED | 1 | 2 | 3 | 4 | ... | ... | 14 | 15 | 16 |
|---|---|---|---|---|---|---|---|---|---|
| 1 | 0000-0000 | 0000-0001 | 0000-0010 | 0000-0011 | ... | ... | 0000-1101 | 0000-1110 | 0000-1111 |
| 2 | 0001-0000 | 0001-0001 | 0001-0010 | 0001-0011 | ... | ... | 0001-1101 | 0001-1110 | 0001-1111 |
| 3 | 0010-0000 | 0010-0001 | 0010-0010 | 0010-0011 | ... | ... | 0010-1101 | 0010-1110 | 0010-1111 |
| ... | ... | ... | ... | ... | ... | ... | ... | ... | ... |
| ... | ... | ... | ... | ... | ... | ... | ... | ... | ... |
| 15 | 1110-0000 | 1110-0001 | 1110-0010 | 1110-0011 | ... | ... | 1110-1101 | 1110-1110 | 1110-1111 |
| 16 | 1111-0000 | 1111-0001 | 1111-0010 | 1111-0011 | ... | ... | 1111-1101 | 1111-1110 | 1111-1111 |
*FIG. 7*
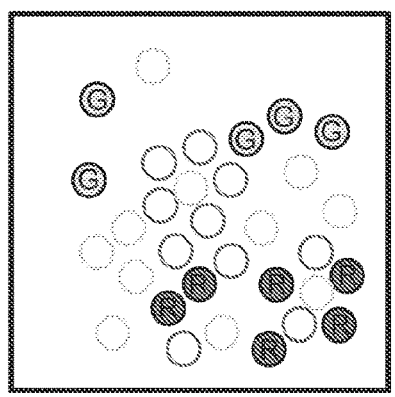
*FIG. 8A*
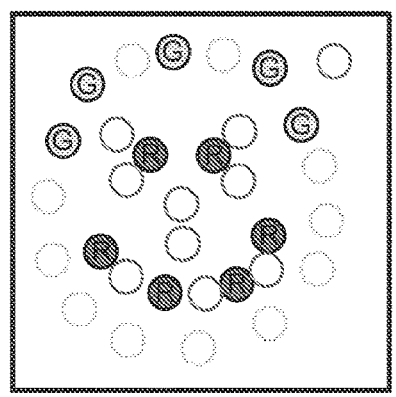
*FIG. 8B*
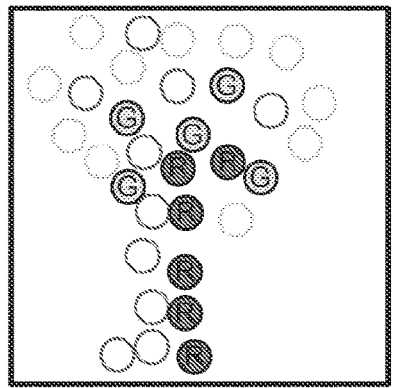
*FIG. 8C*
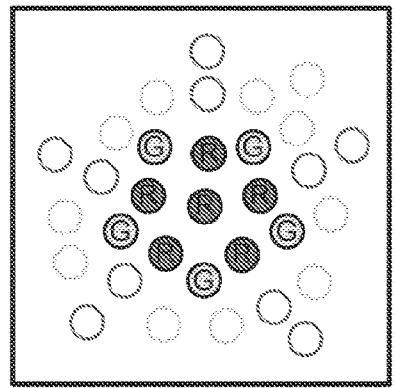
*FIG. 8D*

| ASCII | Hexadecimal | Binary | Coordinates | Number of lit LEDs | Display |
|---|---|---|---|---|---|
| H | 48 | 0100 1000 | (4,8) | Green 5 Red 9 | |
| e | 65 | 0110 0101 | (6,5) | Green 7 Red 6 | |
| l | 6C | 0110 1100 | (6,12) | Green 7 Red 13 | |
| l | 6C | 0110 1100 | (6,12) | Green 7 Red 13 | |
| o | 6F | 0110 1111 | (6,15) | Green 7 Red 16 | |

1104
G → 1106
| Number of LEDs lit | 1 | 2 | 3 | 4 |
|---|---|---|---|---|
| 1 | 0000 | 0001 | 0010 | 0011 |
| 2 | 0100 | 0101 | 010 | 0111 |
| 3 | 1000 | 1001 | 1010 | 1011 |
| 4 | 1100 | 1101 | 1110 | 1111 |
R ↓
1105
*FIG. 11A*
1108
LG → 1110
| Number of LEDs lit | 1 | 2 | 3 | 4 |
|---|---|---|---|---|
| 1 | 0000 | 0001 | 0010 | 0011 |
| 2 | 0100 | 0101 | 010 | 0111 |
| 3 | 1000 | 1001 | 1010 | 1011 |
| 4 | 1100 | 1101 | 1110 | 1111 |
Y ↓
1109
*FIG. 11B*
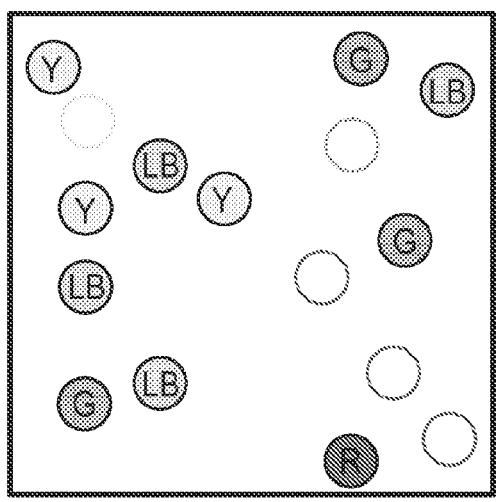
*FIG. 11C*
=
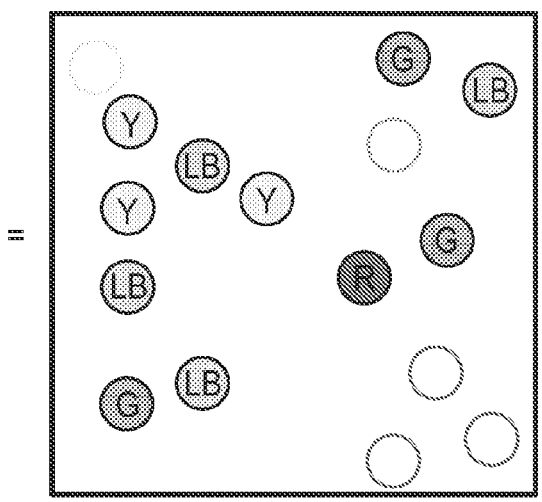
*FIG. 11D*

| Number of lit LED | 0 | 1 | 2 | 3 | ... | ... | 14 | 15 | 16 |
|---|---|---|---|---|---|---|---|---|---|
| 0 | 0000-0000 | 0000-0001 | 0000-0010 | 0000-0011 | ... | ... | 0000-1101 | 0000-1110 | 0000-1111 |
| 1 | 0001-0000 | 0001-0001 | 0001-0010 | 0001-0011 | ... | ... | 0001-1101 | 0001-1110 | 0001-1111 |
| 2 | 0010-0000 | 0010-0001 | 0010-0010 | 0010-0011 | ... | ... | 0010-1101 | 0010-1110 | 0010-1111 |
| ... | ... | ... | ... | ... | ... | ... | ... | ... | ... |
| ... | ... | ... | ... | ... | ... | ... | ... | ... | ... |
| 15 | 1110-0000 | 1110-0001 | 1110-0010 | 1110-0011 | ... | ... | 1110-1101 | 1110-1110 | 1110-1111 |
| 16 | 1111-0000 | 1111-0001 | 1111-0010 | 1111-0011 | ... | ... | 1111-1101 | 1111-1110 | 1111-1111 |

*FIG. 12A*

| Number of lit LED | 0 | 1 | 2 | 3 | ... | ... | 14 | 15 | 16 |
|---|---|---|---|---|---|---|---|---|---|
| 0 | 0000-0000 | 0000-0001 | 0000-0010 | 0000-0011 | ... | ... | 0000-1101 | 0000-1110 | 0000-1111 |
| 1 | 0001-0000 | 0001-0001 | 0001-0010 | 0001-0011 | ... | ... | 0001-1101 | 0001-1110 | 0001-1111 |
| 2 | 0010-0000 | 0010-0001 | 0010-0010 | 0010-0011 | ... | ... | 0010-1101 | 0010-1110 | 0010-1111 |
| ... | ... | ... | ... | ... | ... | ... | ... | ... | ... |
| ... | ... | ... | ... | ... | ... | ... | ... | ... | ... |
| 15 | 1110-0000 | 1110-0001 | 1110-0010 | 1110-0011 | ... | ... | 1110-1101 | 1110-1110 | 1110-1111 |
| 16 | 1111-0000 | 1111-0001 | 1111-0010 | 1111-0011 | ... | ... | 1111-1101 | 1111-1110 | 1111-1111 |

| Number of lit LED | 0 | 1 | 2 | 3 | ... | ... | 14 | 15 | 16 |
|---|---|---|---|---|---|---|---|---|---|
| 0 | 0100-1000 | 0000-0001 | 1010-0010 | 0000-0011 | ... | ... | 0100-0001 | 0001-0110 | 1100-1111 |
| 1 | 0001-0110 | 0001-0001 | 0001-0010 | 0001-0011 | ... | ... | 0001-1001 | 0001-1110 | 0001-1111 |
| 2 | 0010-1100 | 0010-0001 | 0010-0100 | 0010-0011 | ... | ... | 1111-1111 | 0110-1100 | 0010-1111 |
| ... | ... | ... | ... | ... | ... | ... | ... | ... | ... |
| ... | ... | ... | ... | ... | ... | ... | ... | ... | ... |
| 15 | 0000-0000 | 0010-0001 | 1110-0010 | 0110-0101 | ... | ... | 1110-1101 | 1110-0000 | 1110-0011 |
| 16 | 1101-0000 | 1101-0111 | 1111-0000 | 1101-0011 | ... | ... | 1111-1101 | 1111-1110 | 1111-0011 |

| Number of lit LED | 0 | 1 | 2 | 3 | ... | ... | 14 | 15 | 16 |
|---|---|---|---|---|---|---|---|---|---|
| 0 | 0100-0001 | 0000-0001 | 0000-0010 | 0000-0011 | ... | ... | 0000-1101 | 0000-1110 | 0110-1111 |
| 1 | 0001-0000 | 0001-0001 | 0001-0010 | 0001-0011 | ... | ... | 0001-1101 | 0001-1110 | 0001-1111 |
| 2 | 0010-0000 | 0010-0001 | 0010-0010 | 0010-0011 | ... | ... | 0010-1101 | 0010-1110 | 0010-1111 |
| ... | ... | ... | ... | ... | ... | ... | ... | ... | ... |
| ... | ... | ... | ... | ... | ... | ... | ... | ... | ... |
| 15 | 1110-0000 | 1110-0001 | 1110-0010 | 1110-0011 | ... | ... | 0110-1100 | 1110-1110 | 1110-1111 |
| 16 | 1111-0000 | 1111-0001 | 1111-0010 | 1111-0011 | ... | ... | 1111-1101 | 1111-1110 | 1111-1111 |

| ASCII | Hexadecimal | Binary | Coordinates in Referenced Matrix | Reference Matrix Identifier | Display |
|---|---|---|---|---|---|
| H | 48 | 0100 1000 | (0,0) | A | |
| e | 65 | 0110 0101 | (14,3) | A | |
| l | 6C | 0110 1100 | (14,13) | B | |
| l | 6C | 0110 1100 | (2,14) | A | |
| o | 6F | 0110 1111 | (0,15) | B | |

1804 — 1806

| Number of lit LED | 0 | 1 | 2 | 3 | ... | ... | 14 | 15 | 16 |
|---|---|---|---|---|---|---|---|---|---|
| 0 | 0000-1000 | 0000-0001 | 1000-0010 | 0000-0011 | ... | ... | 0000-1101 | 0000-1110 | 0000-1111 |
| 1 | 0001-0000 | 0001-0001 | 0001-0010 | 0001-0011 | ... | ... | 0001-1101 | 0001-1110 | 0001-1111 |
| 2 | 0010-0000 | 0010-0001 | 0010-0010 | 0010-0011 | ... | ... | 0010-1101 | 0010-1110 | 0010-1111 |
| ... | ... | ... | ... | ... | ... | ... | ... | ... | ... |
| ... | ... | ... | ... | ... | ... | ... | ... | ... | ... |
| 15 | 1110-0000 | 1110-0001 | 1110-0010 | 1110-0011 | ... | ... | 1110-1101 | 1110-1110 | 1110-1111 |
| 16 | 1111-0000 | 1111-0001 | 1111-0010 | 1101-0011 | ... | ... | 1111-1101 | 1111-1110 | 1111-1111 |

| Number of lit LED | 0 | 1 | 2 | 3 | ... | ... | 14 | 15 | 16 |
|---|---|---|---|---|---|---|---|---|---|
| 0 | 0000-0000 | 0000-0001 | 0000-0010 | 0000-0011 | ... | ... | 0000-1101 | 0000-1110 | 0000-1111 |
| 1 | 0001-0000 | 0001-0001 | 0001-0010 | 0001-0011 | ... | ... | 0001-1101 | 0001-1110 | 0001-1111 |
| 2 | 0010-0000 | 0010-0001 | 0010-0010 | 0010-0011 | ... | ... | 0010-1101 | 0010-1110 | 0010-1111 |
| ... | ... | ... | ... | ... | ... | ... | ... | ... | ... |
| ... | ... | ... | ... | ... | ... | ... | ... | ... | ... |
| 15 | 1110-0000 | 1110-0001 | 1110-0010 | 1110-0011 | ... | ... | 1110-1101 | 1110-1110 | 1110-1111 |
| 16 | 1111-0000 | 1111-0001 | 1111-0010 | 1111-0011 | ... | ... | 1111-1101 | 1111-1110 | 1111-1111 |

*FIG. 18B*

| ASCII | Hexadecimal | Binary | Display |
|---|---|---|---|
| H e l l | 48<br>65<br>6C<br>6C | 0100 1000<br>0110 0101<br>0110 1100<br>0110 1100 | |
| o , <br> w | 6F<br>2C<br>20<br>57 | 0110 1111<br>0010 1100<br>0010 0000<br>0101 0111 | |
| o r l d | 6F<br>72<br>6C<br>64 | 0110 1111<br>0111 0010<br>0110 1100<br>0110 0100 | |
| ! | 21 | 0010 0001 | |

*FIG. 27*

| ASCII | Hexadecimal | Binary | Display |
|---|---|---|---|
| H | 48 | 0100 1000 | |
| e<br>H | 65<br>48 | 0110 0101<br>0100 1000 | |
| l<br>e<br>H | 6C<br>65<br>48 | 0110 1100<br>0110 0101<br>0100 1000 | |
| l<br>l<br>e<br>H | 6C<br>6C<br>65<br>48 | 0110 1100<br>0110 1100<br>0110 0101<br>0100 1000 | |
| o<br>l<br>l<br>e | 6F<br>6C<br>6C<br>65 | 0110 1111<br>0110 1100<br>0110 1100<br>0110 0101 | |
| o<br>l<br>l | 6F<br>6C<br>6C | 0110 1111<br>0110 1100<br>0110 1100 | |
| o<br>l | 6F<br>6C | 0110 1111<br>0110 1100 | |
| o | 6F | 0110 1111 | |

*FIG. 29*

METHOD, APPARATUS AND SYSTEM FOR VISIBLE LIGHT COMMUNICATION

CROSS-REFERENCE TO RELATED APPLICATIONS

This application is a continuation of U.S. patent application Ser. No. 15/117,499, filed on Aug. 9, 2016, now issued as U.S. Pat. No. 10,014,940, which is the U.S. national phase under 35 U.S.C. § 371 of International Application No. PCT/US2015/011675, filed on Jan. 16, 2015, which claims the benefit of priority under 35 U.S.C. § 119(e) of U.S. Provisional Patent Application No. 61/942,838, filed on Feb. 21, 2014, wherein the contents of the foregoing patent and patent applications are hereby incorporated by reference herein in their entireties.

FIELD OF THE INVENTION

The present invention generally relates to a method for visible light communication, including a method for transmitting and a method for receiving a visible light signal. The present invention also relates to the associated apparatuses and system for visible light communication.

BACKGROUND

Visible light communication (VLC) technology has gained significant interest as light emitting diodes (LEDs) are now widely used for general illumination. VLC technology is able to communicate wirelessly by encoding data to visible light emitted by LEDs, and thus relies on the visible light wavelength band, in contrast to existing wire optical communication technology and infrared ray wireless communication technology. An attractive feature of VLC is the ability to incorporate the wireless communication function into the LEDs without affecting the LEDs' ability to perform its primary purpose, such as general illumination or light display purposes. This is because the LEDs can be modulated to switch on and off at ultra-high speeds (e.g., thousands of times per second) which are far beyond what the human eye is able to detect. Another major advantage is that VLC technology has a broad use band. It can be used without restriction unlike radio frequency (RF) communication where the available frequencies for usage are exhausting and regulated.

However, conventional VLC systems have a number of drawbacks, including low data transmission rate, inflexible display layout/format, and/or lacking in data transfer security.

A need therefore exists to provide a method, an apparatus and a system for VLC which seeks to overcome, or at least ameliorate, one or more of the above deficiencies of the conventional VLC systems. It is against this background that the present invention has been developed.

SUMMARY

According to a first aspect of the present invention, there is provided a method of transmitting a visible light signal in visible light communication, comprising:

binarizing data to be transmitted into a binary bit representation;

encoding the data for transmission by modulating one or more of a plurality of light emitting regions between a first state and a second state based on the binary bit representation of the data; and transmitting the visible light signal in the form of light emitted by one or more of the plurality of modulated light emitting regions, the visible light signal being decodable to obtain the data, wherein the plurality of light emitting regions are positioned within a capture region without being restricted to predetermined locations in the capture region for the visible light signal to be decodable to obtain the data.

Preferably, the method further comprises pre-assigning a number of the plurality of light emitting regions to correspond to a respective nth bit of the binary bit representation of the data, wherein each pre-assigned light emitting region is operable to emit a color different than the remaining pre-assigned light emitting regions of the plurality of light emitting regions such that each nth bit of the binary bit representation of the data is represented by a unique color.

Preferably, said encoding the data comprises modulating each pre-assigned light emitting region between a first state and a second state based on a value of the corresponding nth bit of the binary bit representation of the data.

Preferably, said encoding the data comprises encoding the data based on a reference matrix comprising a predetermined array of binary bit representations by modulating one or more of the plurality of light emitting regions of a first color and one or more of the plurality of light emitting regions of a second color to be at the first state for indicating a coordinate of the binary bit representation in the reference matrix matching the binary bit representation of the data.

Preferably, the predetermined array of binary bit representations has a predetermined number of rows and columns, whereby the number (x) of light emitting regions of the first color modulated to be at the first state corresponds to the xth row of the array and the number (y) of light emitting regions of the second color modulated to be at the first state corresponds to the yth column of the array, and the intersection of the xth row and the yth column indicate the coordinate of the binary bit representation in the reference matrix matching the binary bit representation of the data.

Preferably, the method further comprises providing a plurality of available reference matrices based on which the data can be encoded, wherein the reference matrix is a selected reference matrix of the plurality of available reference matrices, and the selected reference matrix is indicated based on one or more of the colors emitted by one or more of the plurality of light emitting regions.

Preferably, each available reference matrix is associated with one or more unique colors, and the selected reference matrix based on which the data is encoded has associated one or more unique colors matching the one or more colors emitted by the plurality of light emitting regions.

Preferably, each available reference matrix is associated with a unique color, and the method further comprises providing a reference matrix indicator operable to emit a color corresponding to one of the unique colors of the available reference matrices for indicating the selected reference matrix amongst the plurality of available reference matrix based on which the data has been encoded, the selected reference matrix having said unique color matching said color emitted by the reference matrix indicator.

Preferably, said data is a byte of data, and said binarizing data to be transmitted sequentially binarizes a byte of data at a time for transmission.

According to a second aspect of the present invention, there is provided an apparatus for transmitting a visible light signal in visible light communication, comprising:

a binarizing module for binarizing data to be transmitted into a binary bit representation;

a plurality of light emitting regions configured to emit light; and an encoding module for encoding the data for transmission by modulating one or more of the plurality of light emitting regions between a first state and a second state based on the binary bit representation of the data, wherein the visible light signal is transmitted in the form of light emitted by one or more of the plurality of modulated light emitting regions, the visible light signal being decodable to obtain the data, and the plurality of light emitting regions are positioned within a capture region without being restricted to predetermined locations in the capture region for the visible light signal to be decodable to obtain the data.

According to a third aspect of the present invention, there is provided a method of receiving a visible light signal in visible light communication, comprising:

receiving the visible light signal in the form of one or more light spots within a capture region respectively corresponding to light emitted by one or more of a plurality of light emitting regions modulated between a first state and a second state based on a binary bit representation of data; and decoding the visible light signal into the binary bit representation corresponding to the data based on the one or more light spots received, wherein the one or more light spots appear within the capture region without being restricted to predetermined locations in the capture region for the visible light signal to be decodable to obtain the data.

Preferably, the method further comprises storing pre-assigning information pre-assigning a number of the plurality of colors to correspond to a respective nth bit of the binary bit representation of the data, wherein each pre-assigned color is different than the remaining pre-assigned colors such that each nth bit of the binary bit representation of the data is represented by a unique color.

Preferably, said decoding the visible light signal comprises detecting the color of each of the one or more light spots received, and determining the value of the nth bit of the binary bit representation of the data based a presence of the color corresponding to the nth bit of the binary bit representation of the data.

Preferably, the method further comprises storing a reference matrix comprising a predetermined array of binary bit representations, wherein said decoding the visible light signal comprises determining the number of light spots of a first color and the number of light spots of a second color for indicating a coordinate of the binary bit representation in the reference matrix matching the binary bit representation of the data.

Preferably, the predetermined array of binary bit representations has a predetermined number of rows and columns, whereby the number (x) of light spots of the first color corresponds to the xth row of the array and the number (y) of light spots of the second color corresponds to the yth column of the array, and the intersection of the xth row and the yth column indicate the coordinate of the binary bit representation in the reference matrix matching the binary bit representation of the data.

Preferably, said storing a reference matrix comprises storing a plurality of available reference matrices based on which the visible light signal can be decoded, and wherein the reference matrix is a selected reference matrix of the plurality of available reference matrices, and the reference matrix is selected based on one or more of the colors of the light spots received.

Preferably, each available reference matrix is associated with one or more unique colors, and the reference matrix selected for decoding the visible light signal has associated said one or more unique colors matching said one or more colors of the light spots received.

Preferably, each available reference matrix is associated with a unique color, and the method further comprises receiving a reference matrix indicator in the form of one or more light spots having a color for indicating the reference matrix amongst the plurality available reference matrices to be selected for decoding the visible light signal, the reference matrix selected for decoding the visible light signal has associated said unique color matching said color of the reference matrix indicator received.

Preferably, said data is a byte of data, and said decoding the visible light signal sequentially decodes a byte of data at a time.

According to a fourth aspect of the present invention, there is provided an apparatus for receiving a visible light signal in visible light communication, comprising:

a receiving module for receiving the visible light signal in the form of one or more light spots within a capture region respectively corresponding to light emitted by one or more of a plurality of light emitting regions modulated between a first state and a second state based on a binary bit representation of data; and a decoding module for decoding the visible light signal into the binary bit representation corresponding to the data based on the one or more light spots received, wherein the one or more light spots appear within the capture region without being restricted to predetermined locations in the capture region for the visible light signal to be decodable to obtain the data.

According to a fifth aspect of the present invention, there is provided a system for visible light signal in visible light communication, comprising:

an apparatus for transmitting a visible light signal in visible light communication, comprising:
  a binarizing module for binarizing data to be transmitted into a binary bit representation;
  a plurality of light emitting regions configured to emit light; and
  an encoding module for encoding the data for transmission by modulating one or more of the plurality of light emitting regions between a first state and a second state based on the binary bit representation of the data,
  wherein the visible light signal is transmitted in the form of light emitted by one or more of the plurality of modulated light emitting regions, the visible light signal being decodable to obtain the data, and
  the plurality of light emitting regions are positioned within a capture region without being restricted to predetermined locations in the capture region for the visible light signal to be decodable to obtain the data, and an apparatus for receiving a visible light signal in visible light communication, comprising:
  a receiving module for receiving the visible light signal in the form of one or more light spots within a capture region respectively corresponding to light emitted by one or more of a plurality of light emitting regions modulated between a first state and a second state based on a binary bit representation of data; and
  a decoding module for decoding the visible light signal into the binary bit representation corresponding to the data based on the one or more light spots received, wherein the one or more light spots appear within the capture region without being restricted to predetermined locations in the capture region for the visible light signal to be decodable to obtain the data.

According to a sixth aspect of the present invention, there is provided a method of transmitting a visible light signal in visible light communication, comprising:

binarizing a current data to be transmitted into a bit representation; and encoding the current data by modulating one or more of a first set of light emitting regions between a first state and a second state based on the bit representation of the current data, and transmitting the visible light signal in the form of light emitted by one or more of the first set of modulated light emitting regions, the visible light signal being decodable to obtain the current data, wherein the first set of light emitting regions are positioned within a capture region, each light emitting region being positioned at a predetermined location in the detectable region corresponding to a respective bit of the current data, and the method further comprises modulating one or more second sets of light emitting regions within the capture region between a first state and a second state based on the bit representations of one or more previous data for enabling error detection.

Preferably, the method further comprises modulating one or more third set of light emitting regions positioned at predetermined locations in the capture region for signaling the transmission of a next data.

Preferably, the first set of light emitting regions is arranged in a first row in the capture region, the one or more second sets of light emitting regions are arranged in one or more second rows in the capture region, and the third set of light emitting regions are arranged in a first and second columns in the capture region, wherein the third set of light emitting regions are configured to toggle light between the first and second columns for signaling the transmission of the next data.

Preferably, the current data is a byte of data and one or more previous data are one or more previous consecutive bytes of data.

According to a seventh aspect of the present invention, there is provided an apparatus for transmitting a visible light signal in visible light communication, comprising:

a binarizing module for binarizing a current data to be transmitted into a bit representation;

a plurality of light emitting regions configured to emit light; and an encoding module configured for encoding the current data by modulating one or more of a first set of light emitting regions between a first state and a second state based on the bit representation of the current data, wherein the visible light signal is transmitted in the form of light emitted by one or more of the first set of modulated light emitting regions, the visible light signal being decodable to obtain the current data, the first set of light emitting regions are positioned within a capture region, each light emitting region being positioned at a predetermined location in the detectable region corresponding to a respective bit of the current data, and the encoding module is further configured for modulating one or more second sets of light emitting regions within the capture region between a first state and a second state based on the bit representations of one or more previous data for enabling error detection.

According to an eighth aspect of the present invention, there is provided a method of receiving a visible light signal in visible light communication, comprising:

receiving the visible light signal in the form of a first set of one or more light spots within a capture region respectively corresponding to light emitted by a first set of light emitting regions modulated between a first state and a second state based on a binary bit representation of a current data transmitted; and decoding the visible light signal into the binary bit representation corresponding to the current data based on the one or more light spots received, wherein the first set of light spots appear at predetermined locations within the capture region, and the visible light signal further comprises one or more second sets of one or more light spots within the capture region respectively corresponding to light emitted by one or more second sets of light emitting regions modulated between a first state and a second state based on the bit representations of one or more previous data for enabling error detection.

Preferably, the visible light signal further comprises a third set of one or more light spots, corresponding to light emitted by a third set of modulated light emitting regions, appearing at predetermined locations in the capture region for signaling the transmission of a next data.

Preferably, the first set of light spots are configured to appear in a first row in the capture region, the one or more second sets of light spots are configured to appear in one or more second rows in the capture region, and the third set of light spots are configured to appear in a first and second columns in the capture region, wherein the third set of light spots are configured to toggle between the first and second columns for signaling the transmission of the next data.

Preferably, the current data is a byte of data and one or more previous data are one or more previous consecutive bytes of data.

According to a ninth aspect of the present invention, there is provided an apparatus for receiving a visible light signal in visible light communication, comprising:

a receiving module for receiving the visible light signal in the form of a first set of one or more light spots within a capture region respectively corresponding to light emitted by a first set of light emitting regions modulated between a first state and a second state based on a binary bit representation of a current data transmitted; and a decoding module for decoding the visible light signal into the binary bit representation corresponding to the current data based on the one or more light spots received, wherein the first set of light spots appear at predetermined locations within the capture region, and the visible light signal further comprises one or more second sets of one or more light spots within the capture region respectively corresponding to light emitted by one or more second sets of light emitting regions modulated between a first state and a second state based on the bit representations of one or more previous data for enabling error detection.

According to a tenth aspect of the present invention, there is provided a system for visible light signal in visible light communication, comprising:

an apparatus for transmitting a visible light signal in visible light communication, comprising:

a binarizing module for binarizing a current data to be transmitted into a bit representation;

a plurality of light emitting regions configured to emit light; and an encoding module configured for encoding the current data by modulating one or more of a first set of light emitting regions between a first state and a second state based on the bit representation of the current data, wherein the visible light signal is transmitted in the form of light emitted by one or more of the first set of modulated light emitting regions, the visible light signal being decodable to obtain the current data, the first set of light emitting regions are positioned within a capture region, each light emitting region being positioned at a predetermined location in the detectable region corresponding to a respective bit of the current data, and the encoding module is further configured for modulating one or more second sets of light emitting regions within the capture region between a first state and a second state based on the bit representations of one or more previous data for enabling error detection, and an apparatus for receiving a visible light signal in visible light communication, comprising:

a receiving module for receiving the visible light signal in the form of a first set of one or more light spots within a capture region respectively corresponding to light emitted by a first set of light emitting regions modulated between a first state and a second state based on a binary bit representation of a current data transmitted; and a decoding module for decoding the visible light signal into the binary bit representation corresponding to the current data based on the one or more light spots received, wherein the first set of light spots appear at predetermined locations within the capture region, and the visible light signal further comprises one or more second sets of one or more light spots within the capture region respectively corresponding to light emitted by one or more second sets of light emitting regions modulated between a first state and a second state based on the bit representations of one or more previous data for enabling error detection.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 7 illustrates an example reference matrix having a predetermined 16×16 array of binary bit representations in the embodiment of FIG. 6;

FIGS. 8A to 8D illustrate example arrangements of LEDs for transmitting the same byte of data in the embodiment of FIG. 6;

FIGS. 11A and 11B illustrate two example available reference matrices which may be used to encode/decode a byte of data according to an embodiment of the present invention.

FIGS. 11C and 11D illustrate example arrangement of LEDs/light spots for transmitting/decoding an example binary bit representation based on the reference matrices shown in FIGS. 11A and 11B;

FIGS. 12A and 12B illustrate two example available reference matrices which may be used to encode/decode two bytes of data at once according to an embodiment of the present invention;

FIGS. 14A and 14B illustrate two example reference matrices 1404, 1408 which may be used to encode/decode a byte of data according to the embodiment of FIG. 13;

FIGS. 18A and 18B illustrate two example reference matrices based on which data may be encoded/decoded according to an embodiment of the present invention;

FIG. 27 illustrates an example for transmitting/decoding an example phrase according to the system shown in FIG. 25;

FIG. 29 illustrates another example for transmitting/ decoding the word "Hello" according to the system shown in FIG. 25;

DETAILED DESCRIPTION

Figure 1:
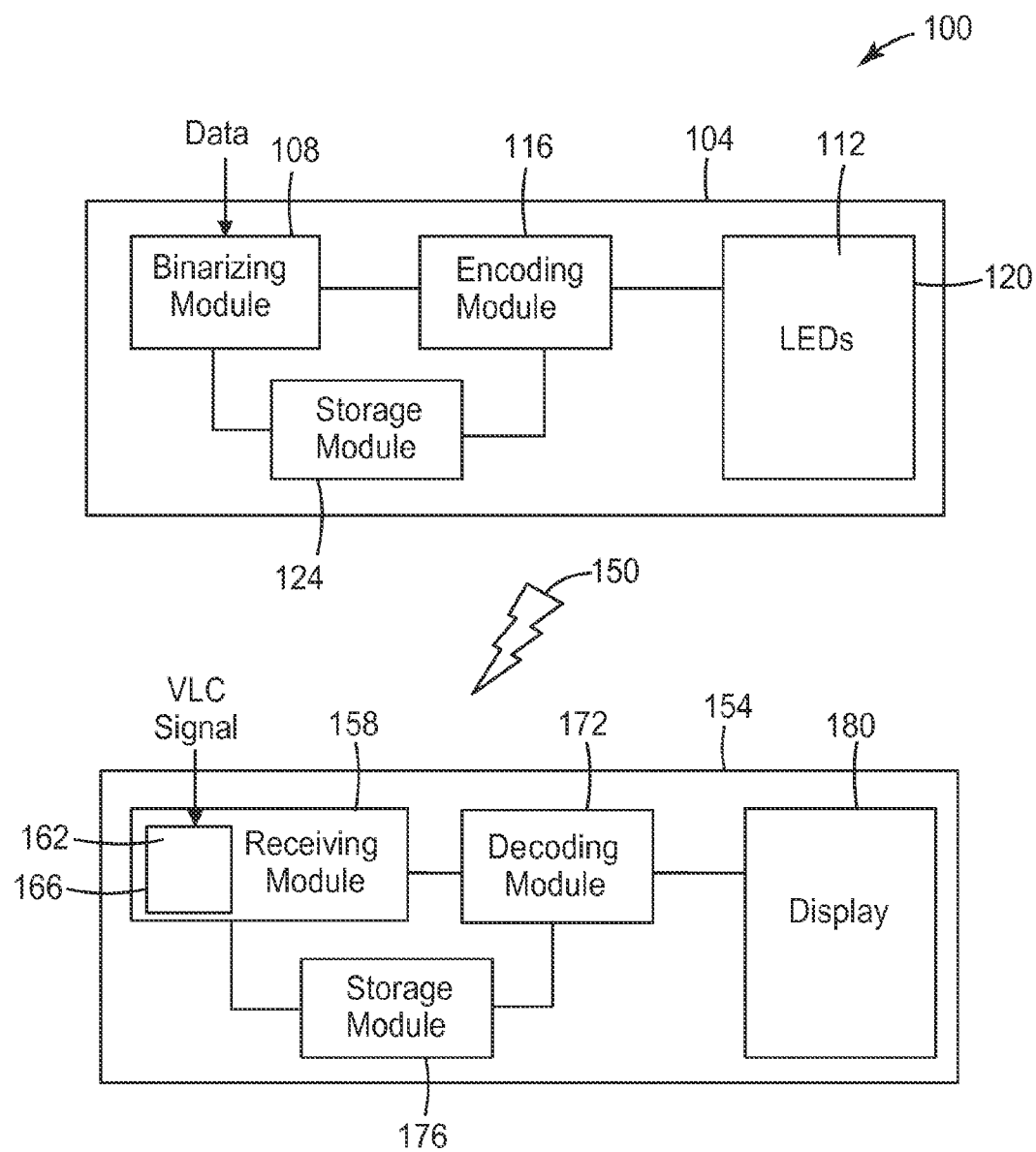
FIG. 1 depicts a schematic diagram generally illustrating a system for visible light communication according to an example embodiment of the present invention.

Embodiments of the present invention provide a method, an apparatus and a system for visible light communication (VLC) which seek to overcome, or at least ameliorate, one or more of the deficiencies of the conventional VLC systems mentioned in the background.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatuses may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of a more specialized apparatus to perform the required method steps may be appropriate. The structure of an exemplary conventional general purpose computer will be described later below with reference to FIG. 31.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. The computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the preferred method(s) described herein.

The invention may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

FIG. 1 depicts a schematic diagram generally illustrating a system 100 for visible light communication according to an example embodiment of the present invention. The system 100 comprises an apparatus 104 (or a VLC transmitter) for encoding data and transmitting the encoded data in the form of a visible light signal 150, and an apparatus 154 (or a VLC receiver) for receiving the visible light signal 150 from the VLC transmitter 104 and decoding the visible light signal 150 to obtain the original data.

Certain components of the VLC transmitter 104 are generally illustrated in FIG. 1. In the example embodiment, the VLC transmitter 104 comprises a binarizing module 108 for binarizing data to be transmitted into a binary bit representation, a plurality of light emitting regions (e.g., light emitting diodes (LEDs)) 112 configured to emit light, and an encoding module 116 for encoding the data for transmission by modulating one or more of the plurality of light emitting regions 112 between a first state and a second state (e.g., ON and OFF states) based on the binary bit representation of the data. In the example embodiment, the visible light signal 150 is transmitted in the form of light emitted by one or more of the plurality of modulated light emitting regions 112, and the visible light signal 150 is decodable to obtain the data. Furthermore, the plurality of light emitting regions 112 are positioned within a capture region 120 (i.e., a desired area or region of interest for disposing the plurality of light emitting regions 112) without being restricted to predetermined locations in the capture region 120 for the visible light signal 150 to be decodable to obtain the data. This is highly advantageous as it allows great flexibility in the display layout/format (i.e., the arrangement of the light emitting regions 112) without requiring the light emitting regions 112 to be positioned at certain predetermined locations within the capture region 120 in order for the visible light signal 150 to be decodable to obtain the data. As shown in FIG. 1, the VLC transmitter 104 may further comprise a storage module 124 for storing various data as desired.

Certain components of the VLC receiver 154 are also illustrated in FIG. 1. In the example embodiment, the VLC receiver 154 comprises a receiving module 158 (e.g., an image capturing device) for receiving the visible light signal 150 in the form of one or more light spots 162 within a capture region 166 (e.g., a light sensor area) respectively corresponding to light emitted by one or more of a plurality of light emitting regions 112 at the VLC transmitter 104 modulated between a first state and a second state (e.g., ON and OFF states) based on a binary bit representation of data, and a decoding module 172 for decoding the visible light signal 150 into the binary bit representation corresponding to the data based on the one or more light spots 162 received. In the example embodiment, the one or more light spots 162 appear within the capture region 166 without being restricted to predetermined locations in the capture region 166 for the visible light signal 150 to be decodable to obtain the data. As explained above, this is highly advantageous as it allows great flexibility in the display layout/format of the light emitting regions 112. As shown in FIG. 1, the VLC receiver 154 may further comprises a storage module 176 for storing various data as desired and a display screen 180 for displaying the decoded data to a user.

Figure 2A:
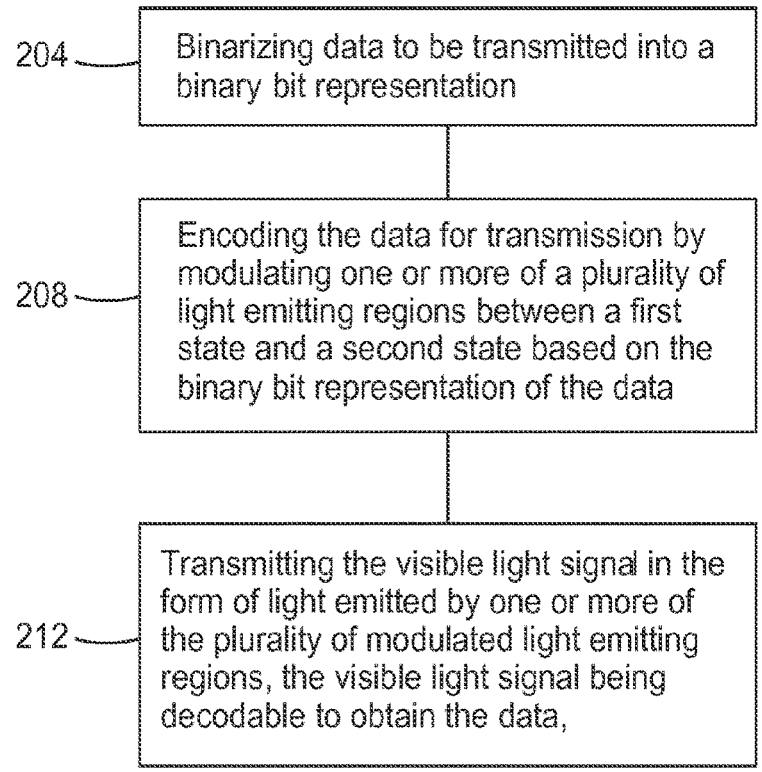
FIG. 2A depicts a flow diagram generally illustrating a method of transmitting a visible light signal in visible light communication corresponding to the VLC transmitter shown in FIG. 1.

FIG. 2A depicts a flow diagram generally illustrating a method 200 of transmitting a visible light signal 150 in visible light communication corresponding to the VLC transmitter 104 as described with reference to FIG. 1. The method comprises a step 204 of binarizing data to be transmitted into a binary bit representation, a step 208 of encoding the data for transmission by modulating one or more of a plurality of light emitting regions 112 between a first state and a second state based on the binary bit representation of the data, and a step 212 of transmitting the visible light signal 150 in the form of light emitted by one or more of the plurality of modulated light emitting regions 112, the visible light signal 150 being decodable to obtain the data. In the example embodiment, the plurality of light emitting regions 112 are positioned within a capture region 120 without being restricted to predetermined locations in the capture region for the visible light signal to be decodable to obtain the data.

Figure 2B:
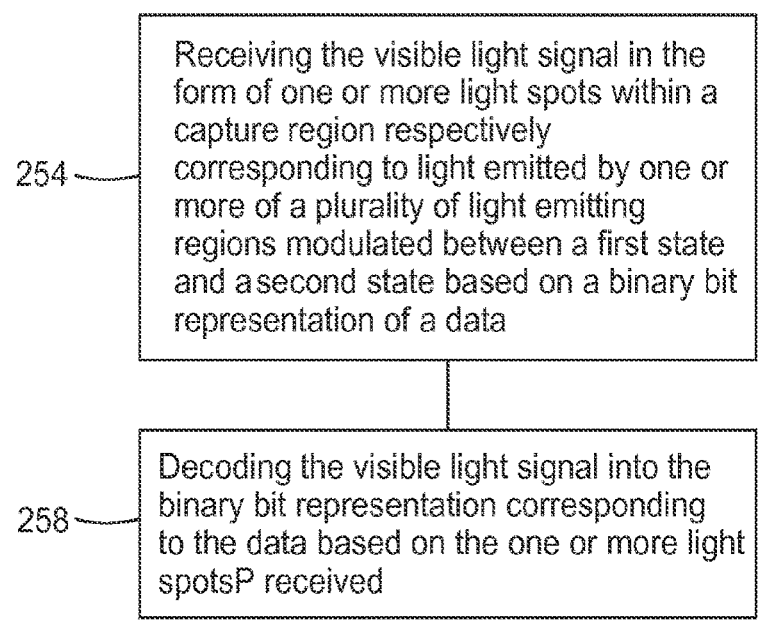
FIG. 2B depicts a flow diagram generally illustrating a method of receiving a visible light signal in visible light communication corresponding to the VLC receiver shown in FIG. 1.

FIG. 2B depicts a flow diagram generally illustrating a method 250 of receiving a visible light signal 150 in visible light communication corresponding to the VLC receiver 154 as described with reference to FIG. 1. The method comprises a step 254 of receiving the visible light signal 150 in the form of one or more light spots 162 within a capture region 166 respectively corresponding to light emitted by one or more of a plurality of light emitting regions 112 at the VLC transmitter 104 modulated between a first state and a second state based on a binary bit representation of data, and a step 258 of decoding the visible light signal into the binary bit representation corresponding to the data based on the one or more light spots 162 received. In the example embodiment, the one or more light spots 162 appear within the capture region 166 without being restricted to predetermined locations in the capture region 166 for the visible light signal 150 to be decodable to obtain the data.

It will be appreciated to a person skilled in the art that the above-described steps may be performed in another order as appropriate and are not limited to the order presented. Furthermore, the above steps are not intended to be construed to necessitate individual/separate steps and may be combined as or performed in one step where appropriate without deviating from the scope of the present invention.

For clarity and illustration purposes, the above exemplary embodiments will now be described in further detail with respect to preferred examples. However, it will be appreciated by a person skilled in the art that the present invention is not limited to the preferred examples, and certain aspects of the preferred examples may be modified or varied as appropriate while still falling within the scope of the exemplary embodiments as described in FIGS. 1 and 2. Furthermore, for clarity and simplicity, the light emitting regions 112 will hereinafter be described as light emitting diodes (LEDs). However, it will be appreciated that the light emitting regions 112 are not limited to being light emitting diodes and other forms of light emitting regions 112 are within the scope of the present invention, such as light regions on a display screen projected by a projector.

Figure 3:
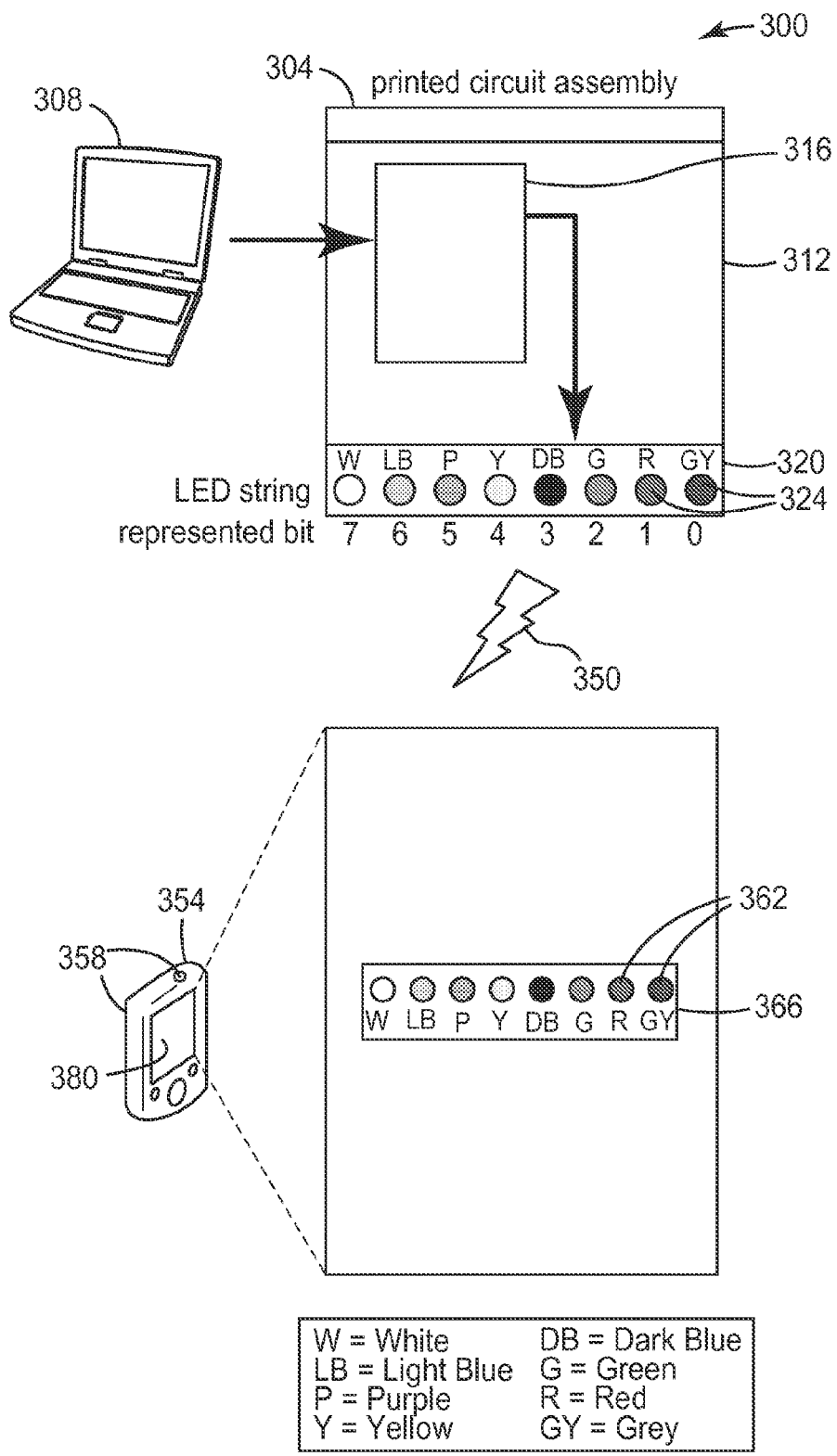
FIG. 3 depicts a schematic diagram generally illustrating a system for visible light communication according to an example embodiment of the present invention.

FIG. 3 depicts a schematic diagram generally illustrating a system 300 for visible light communication according to an example embodiment of the present invention. In this example embodiment, the VLC transmitter 304 is realized by a light emitting module 312 communicatively coupled to a computer device 308. The computer device 308 may be any general purpose computer such as that illustrated in FIG. 31 or any specialized or purpose-built processing device capable of receiving an input data and transmitting the input data to the transmitter 304 for further processing. The transmitter 304 may be implemented in various forms depending on the application such as, but not limited to, in the form of a lighting device for general illumination, an LED display signage or a traffic light. Numerous other applications exist as long as light is being emitted since the emitted light can be modulated for visible light communication. The computer device 308 is operable to transmit data to the light emitting module 312. The light emitting module 312 comprises a processing module 316 for binarizing data to be transmitted into a binary bit representation and encoding the data by modulating the plurality of light emitting devices (LEDs) 324 between a first state and a second state (e.g., ON and OFF states) based on the binary bit representation of the data in the form of a visible light signal 350. In this example embodiment, the binarizing module 108 and the encoding module 116 shown in FIG. 1 are realized by the processing module (e.g., a processor or microcontroller) 316 shown in FIG. 3. The VLC receiver 354 is realized by a computer device 354, such as a mobile communicative device, as shown in FIG. 3. The computer device 354 comprises a receiving module 358 in the form of an image capturing module, such as a digital charge-coupled device (CCD) or a complementary metal-oxide-semiconductor (CMOS) active pixel sensor, capable of detecting the visible light signal 350 in the form of one or more light spots 362 within a capture region 366. For example, in the case of a mobile communication device, the image capturing module 358 is typically provided at a back and/or a front portion of the device as shown in FIG. 3. For illustration purposes, FIG. 3 also schematically illustrates the visible light detected by the image capture module 358 within the capture region 366. The computer device 354 further comprises a decoding module 172 (not shown in FIG. 3) for decoding the visible light signal 150 into a binary bit representation based on the one or more light spots 362 received and a display module 380 for displaying the decoded data to the user.

Figures 4A, 4B:
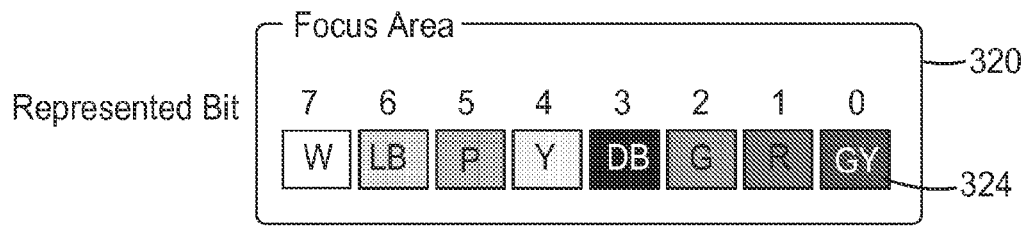
FIG. 4A schematically illustrates an example of the unique colors respectively pre-assigned to each bit of the binary bit representation according to the embodiment of FIG. 3.
FIG. 4B illustrates an example of transmitting/decoding the word "Hello" based on the system shown in FIG. 3.

In this example embodiment, the plurality of LEDs 324 is capable of emitting multiple colors. For example, as shown in FIG. 3, eight LEDs 324 are provided in the capture region 320 each configured to emit a unique color (i.e., a color different from other LEDs 324 in the capture region 320). In particular, each LED 324 is pre-assigned to correspond to a respective nth bit of the binary bit representation such that each nth bit of the binary bit representation is represented by a unique color. By way of example only, as illustrated in FIG. 4A, the most significant bit (MSB) zeroth bit to the least significant bit (LSB) seventh bit of the binary bit representation are pre-assigned to be associated with the colors grey (GY), red (R), green (G), dark blue (DB), yellow (Y), purple (P), light blue (LB) and white (W), respectively. Accordingly, each pre-assigned LED 324 can be modulated by the encoding module 316 to be either at a first state (e.g., ON state) or a second state (e.g., OFF state) based on the value of the corresponding nth bit of the binary bit representation of the data. The VLC receiver 354 has stored therein (e.g., in the storage module 176) the above pre-assigning information assigning each of the LEDs 324 to correspond to the respective nth bit of the binary bit representation of the data. Therefore, the visible light signal 350 received by the VLC receiver 354 may be decoded by detecting the color of each of the one or more light spots 362 received, and determining the value of the nth bit of the binary bit representation of the data based a presence of the color corresponding to the nth bit of the binary bit representation of the data.

For clarity and illustration purposes, an example will now be described with reference to FIG. 4B for transmitting the word "Hello". In this example, each character of the word is binarized into a binary bit representation based on the ASCII standard and transmitted sequentially (i.e., one character/byte at a time). As illustrated, the character "H" is converted into a binary bit representation of "0100 1000", and based on the above-mentioned pre-assigning information as shown in FIG. 4A, each nth bit of the binary bit representation having a value "1" results in the corresponding pre-assigned LED 324 being modulated by the processing module 316 to be in the ON state (i.e., emit light of its unique color). Therefore, for the binary bit representation of "0100 1000", since the third and sixth bits have the value "1", the corresponding dark blue color LED and the light blue color LED are modulated to be in the ON state. At the VLC receiver 354 end, upon detecting only two light spots 362 of the dark blue and light blue colors, the corresponding third and sixth bits of the binary bit representation of the data are determined to have the value "1" and the remaining 6 bits are determined to have the value "0". This results in the decoded binary bit representation of "0100 1000", which can then be converted into the character "H". The remaining characters "e", "l", "l", and "o" of the word are also encoded/decoded in the same manner as the character "H" as illustrated in FIG. 4B and thus will not be repeated for conciseness.

Figure 4C:
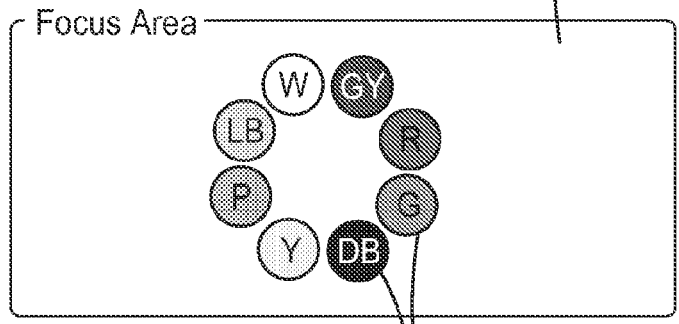
FIG. 4C illustrates another example of transmitting/decoding a character based on the system shown in FIG. 3.

In this example embodiment, since each LED 324 is pre-assigned to correspond to a respective nth bit of the binary bit representation, the LEDs 324 may be positioned anywhere within the capture region 320 (i.e., a desired area or region of interest for disposing the LEDs 324) without being restricted to predetermined locations therein for the visible light signal 350 to be decodable to obtain the data. This is highly advantageous as it allows great flexibility in the display layout/format of the LEDs 324 at the transmitter 304 end (i.e., the arrangement of the LEDs 324). In particular, the LEDs 324 can be arranged anywhere within the capture region 320 to form any desired shape. As an example, FIG. 4C illustrates the LEDs 324 being arranged within the capture region 320 to form a circle shape and yet the visible light signal 350 generated by the LEDs 324 are still able to be decoded at the receiver 354 end without requiring any modifications at the receiver 354 end.

Figure 5A:
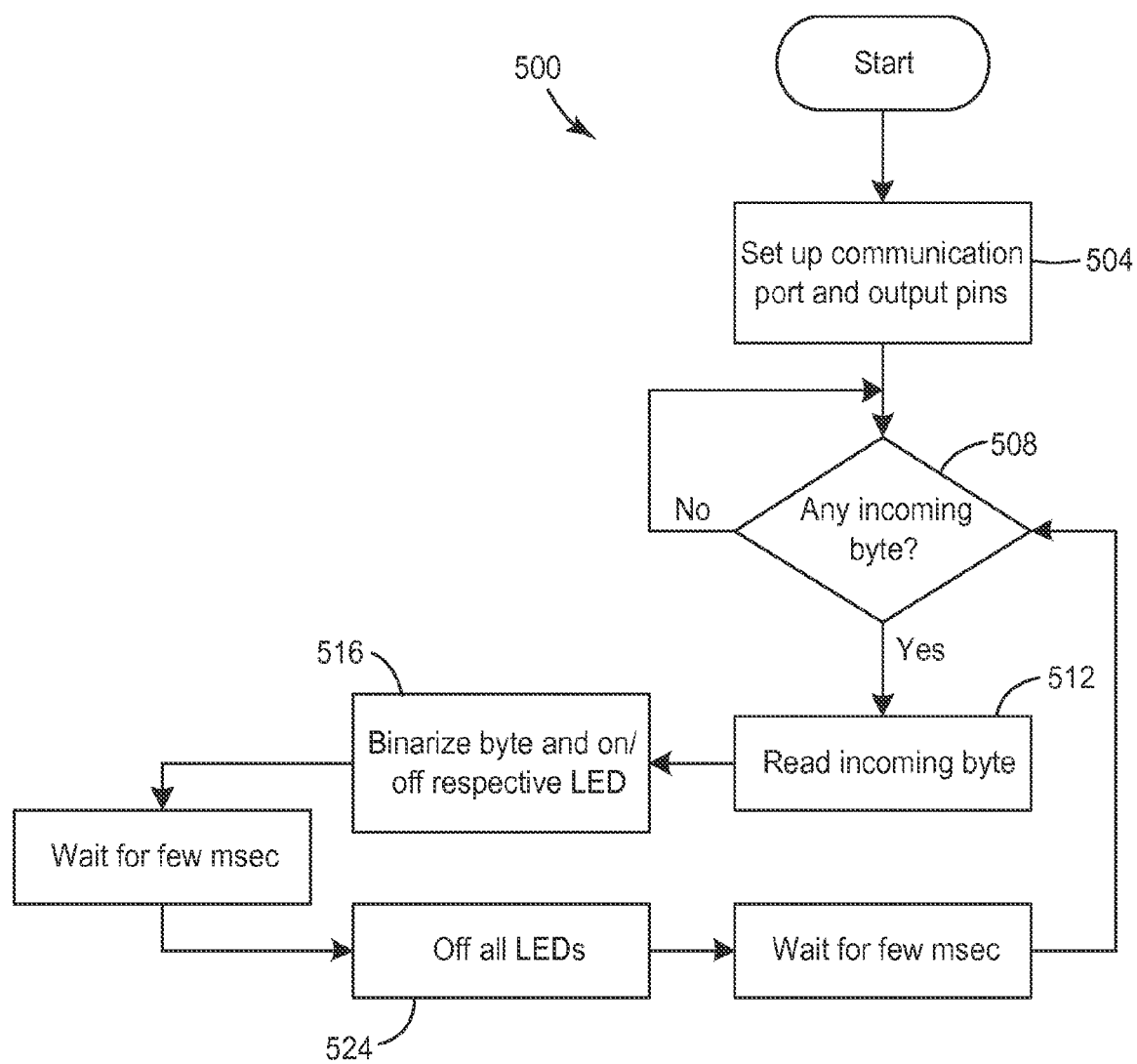
FIG. 5A illustrates an example flow diagram of the VLC transmission method according to the system shown in FIG. 3.

FIG. 5A illustrates a flow diagram of the VLC transmission method 500 according to an example embodiment of the present invention. As a first step 504, the computer device 308 is communicatively coupled to the processing module 316 of the transmitter 304 for transmitting the data to the processing module 316 for processing. For example, as shown in FIG. 3, the processing module 316 may be a microcontroller having inputs for receiving the data and outputs connected to the LEDs 324 for modulating the LEDs 324 based on the binarized data. At step 508, the processing module 316 listens/waits for incoming data in the form a series of bytes of data. Once an incoming byte is detected, the incoming byte is read at step 512 and the processing module 316 proceeds at step 516 to binarize the received byte and modulate the LEDs 324 in the manner based on the binary bit representation of the byte as described hereinbefore. This modulated state of the LEDs 324 is then held for a predetermined short period of time (e.g., a few milliseconds) before all the LEDs 324 are switched to an OFF state at step 524. After another predetermined short period of time (e.g., a few milliseconds), the transmission method 500 returns to the step 508 where the encoding module 316 listens/waits for the next incoming byte.

Figure 5B:
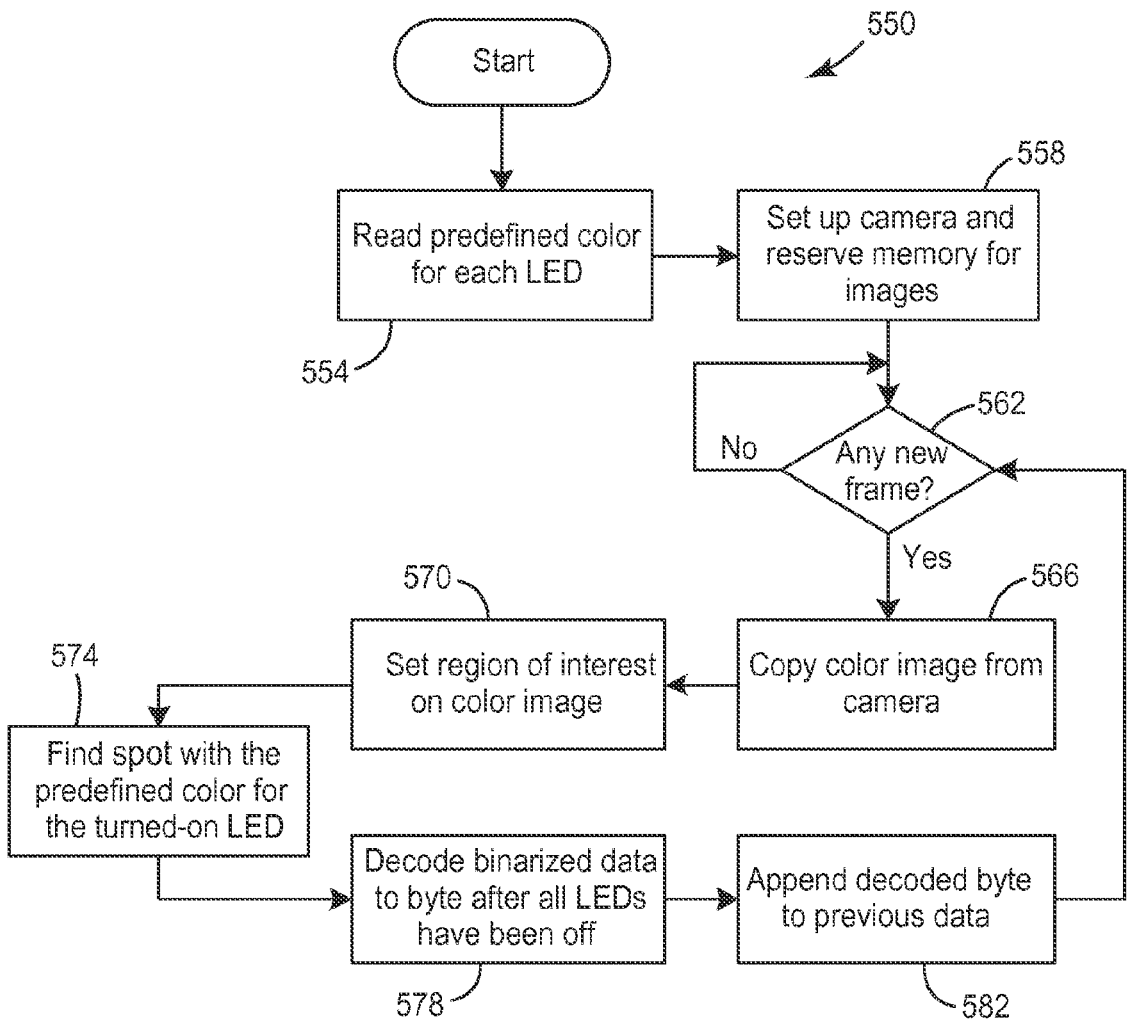
FIG. 5B illustrates an example flow diagram of the VLC receiving method according to the system shown in FIG. 3.

FIG. 5B illustrates a flow diagram of the VLC receiving method 550 according to an example embodiment of the present invention. As a first step 554, the pre-assigned or pre-defined information is read, e.g., from the storage module 176. Next at step 558, the receiving module 358 (e.g., an image capture module) is initiated/set up to receive the visible light signal 350 and spaces in the storage module 176 (e.g., ROM and/or RAM memory) are allotted/reserved for storing the visible light signal 350. Then at step 562, the decoding module 172 listens/waits for an incoming frame of the visible light signal 350 detected by the receiving module 358. Once a new frame is detected, the incoming frame is read from the receiving module 358 at step 566 and a region of interest corresponding to the capture region 366 is set containing one or more light spots 362 detected. Then, the light spots 362 are identified/detected at step 574 and they are decoded at step 578 by determining the value of the nth bit of the binary bit representation of the data based the presence of the color corresponding to the nth bit of the binary bit representation of the data as described hereinbefore. The decoded byte of data is then appended to any previously decoded byte if available/appropriate and then the receiving method 550 returns to the step 562 where the decoding module 316 listens/waits for the next frame from the receiving module 358.

Figure 6:
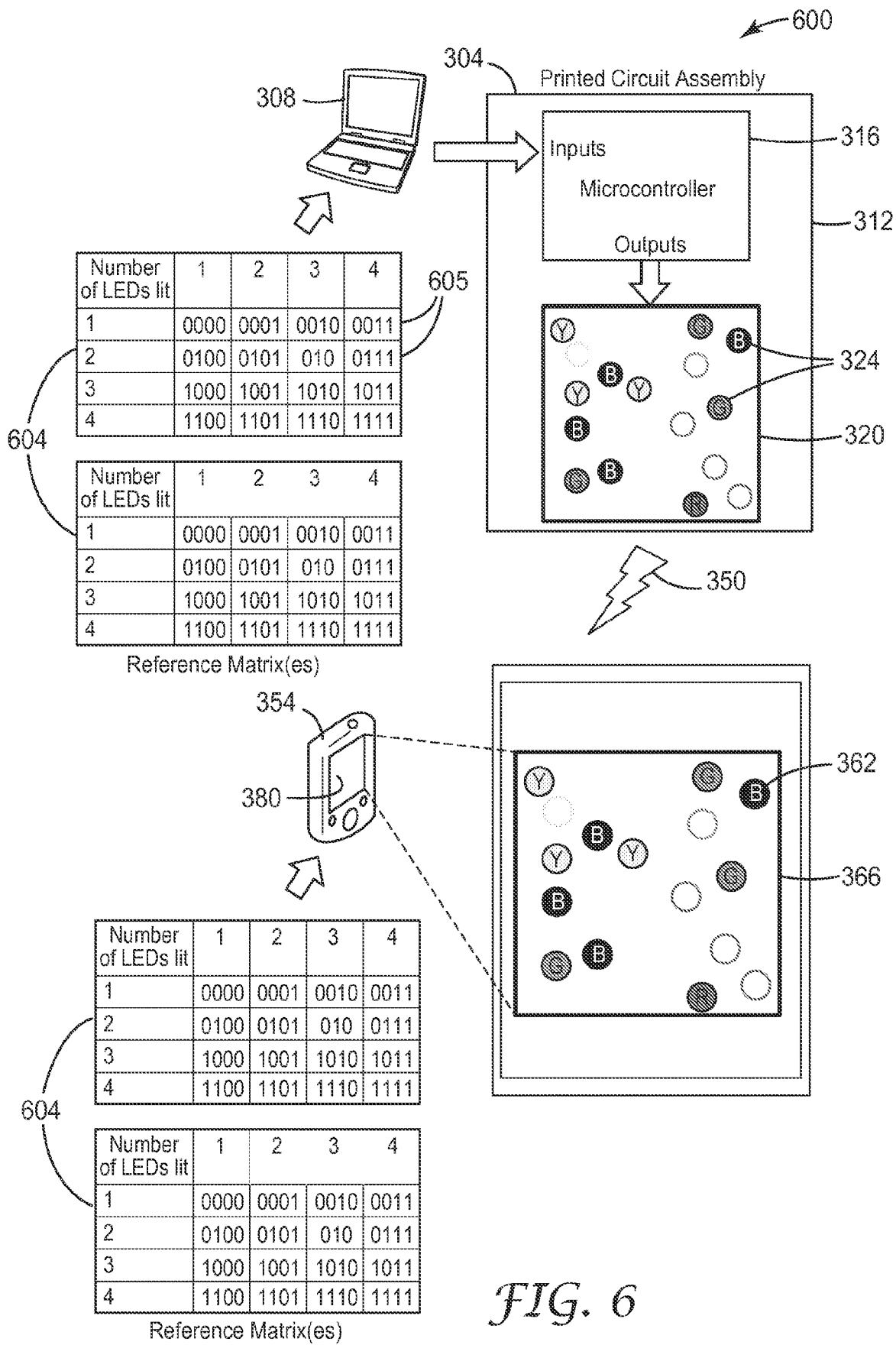
FIG. 6 depicts a schematic diagram generally illustrating a system for visible light communication according to an example embodiment of the present invention.

FIG. 6 depicts a schematic diagram generally illustrating a system 600 for visible light communication according to an example embodiment of the present invention. The system 600 is the same as the system 300 as described with reference to FIG. 3, except that one or more reference matrices 604 are used to encode the data from the computer device 308 (instead of pre-assigning each LED 324 to correspond to a respective nth bit of the binary bit representation such that each nth bit of the binary bit representation is represented by a unique color). It will be appreciated that the components/parts of the system 600 the same as those in the system 300 are indicated by the same reference numbers, and may have the same construction and same function, unless otherwise specified.

In particular, in this example embodiment, the data from the computer device 308 is encoded by the processing module 316 of the transmitter 304 based on a reference matrix 604 comprising a predetermined array of binary bit representations 605. More specifically, the data is encoded by the processing module 316 modulating a number of the LEDs 324 of a first color and a number of the LEDs 324 of a second color to be at the first state (i.e. ON) for indicating a coordinate (i, j) of the binary bit representation 605 in the reference matrix 604 matching the binary bit representation of the data. In a preferred embodiment, the reference matrix 604 has a predetermined number of rows and columns, whereby the number (x) of LEDs 324 of the first color (e.g., red) modulated to be at the first state corresponds to the xth row of the reference matrix 604 and the number (y) of LEDs 324 of the second color (e.g., blue) modulated to be at the first state corresponds to the yth column of the reference matrix 604, and the intersection of the xth row and the yth column indicate the coordinate (i, j) (where i=x−1, and j=y−1) of the binary bit representation 605 in the reference matrix matching the binary bit representation of the data.

FIG. 7 illustrates an example reference matrix 604 having a predetermined 16×16 array of 256 8-bit numbers (i.e., 256 binary bit representations). In the example reference matrix 604 shown, for example, the cell at coordinate (0, 0) has the value "0000 0000", the cell at coordinate (2, 3) has the value "0010 0011", and the cell at coordinate (15, 15) has the value "1111 1111". For example, the rows 608 of the reference matrix 604 are associated with the color green (G) and the columns 612 of the reference matrix 604 are associated with the color red (R). Accordingly, the number of green LEDs 324 and the number of red LEDs 324 are modulated to be in the ON state (i.e., light emitting state) corresponding to the row and column of the binary bit representation located in the predetermined reference matrix 604 matching the binary bit representation of the data.

FIG. 8A illustrates an example where five green LEDs and six red LEDs are modulated to be in the ON state by the processing module 316 for transmitting a byte having a binary bit representation of "0100 0101". At the receiver 354 end, the visible light signal 350 detected comprising 5 green and 6 red colored light spots 362 can be decoded using the predetermined reference matrix 604. In particular, the 5 green colored light spots 362 and the 6 red colored light spots 362 detected indicate the cell of the reference matrix 604 at the intersection of the fifth row and the sixth column (i.e., coordinate (4, 5)), which has a binary bit representation of "0100 0101". This decoded binary bit representation at the receiver 354 matches the binary bit representation of the data transmitted by the transmitter 304. Preferably, the predetermined reference matrix 604 is stored at both the storage module 124 of the transmitter 304 and the storage module 176 of the receiver 354.

Accordingly, in this example embodiment, the LEDs 324 may be arranged as desired to form various layouts/shapes while still being able to transmit the same data since it is the number of LEDs lit in each color that transmits the data and not the specific LEDs which are lit. Therefore, the LEDs 324 may be arranged anywhere within the capture area 320 without being restricted to predetermined locations therein for the visible light signal 350 to be decodable to obtain the original data. This is highly advantageous as it allows great flexibility in the display layout/format of the LEDs at the transmitter 304 end. In addition, it also allows the original/initial positions of the individual LEDs 324 at the transmitter 304 end to be altered without requiring any modifications to the decoding process at the receiver 354 end. For illustration purposes only, FIGS. 8B to 8D illustrate various exemplary LED layouts at the transmitter 304 end while still transmitting the same data (i.e., "0100 0101") as shown in FIG. 8A since they all have five green and six red LEDs 324 modulated to be at the ON state.

Figures 9A, 9B:
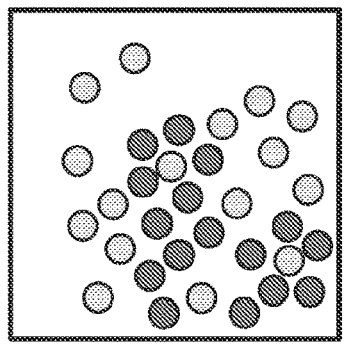
FIGS. 9A and 9B illustrate an example of transmitting/decoding the word "Hello" according to the system shown in FIG. 6.

For clarity and illustration purposes, an example will now be described with reference to FIGS. 9A and 9B for transmitting the same word "Hello" as in FIG. 4B. The LEDs 324 at the transmitter 304 end is schematically depicted in FIG. 9A. In FIG. 9B, each character of the word is binarized into a binary bit representation based on the ASCII standard and transmitted sequentially (i.e., one character/byte of data at a time). As illustrated, the character "H" is converted into a binary bit representation of "0100 1000", and based on the predetermined reference matrix 604 shown in FIG. 7, 5 green and 9 red LEDs are modulated by the processing module 316 to be in the ON state (i.e., light emitting state). At the receiver 354 end, upon detecting only five green and nine red light spots 362, the decoding module 172 determines the binary bit representation to be "0100 1000" based on the predetermined reference matrix 604. In particular, the 5 green and 9 red colored light spots 362 detected indicate the cell in the predetermined reference matrix 604 at the intersection of the fifth row and the ninth column (i.e., coordinate (4, 8)), which has a binary bit representation of "0100 1000". This decoded binary bit representation can then be converted into the character "H". The remaining characters "e", "l", "l", and "o" of the word are also encoded/decoded in the same manner as the character "H" as illustrated in FIG. 9B and thus will not be repeated for conciseness.

Figure 10A:
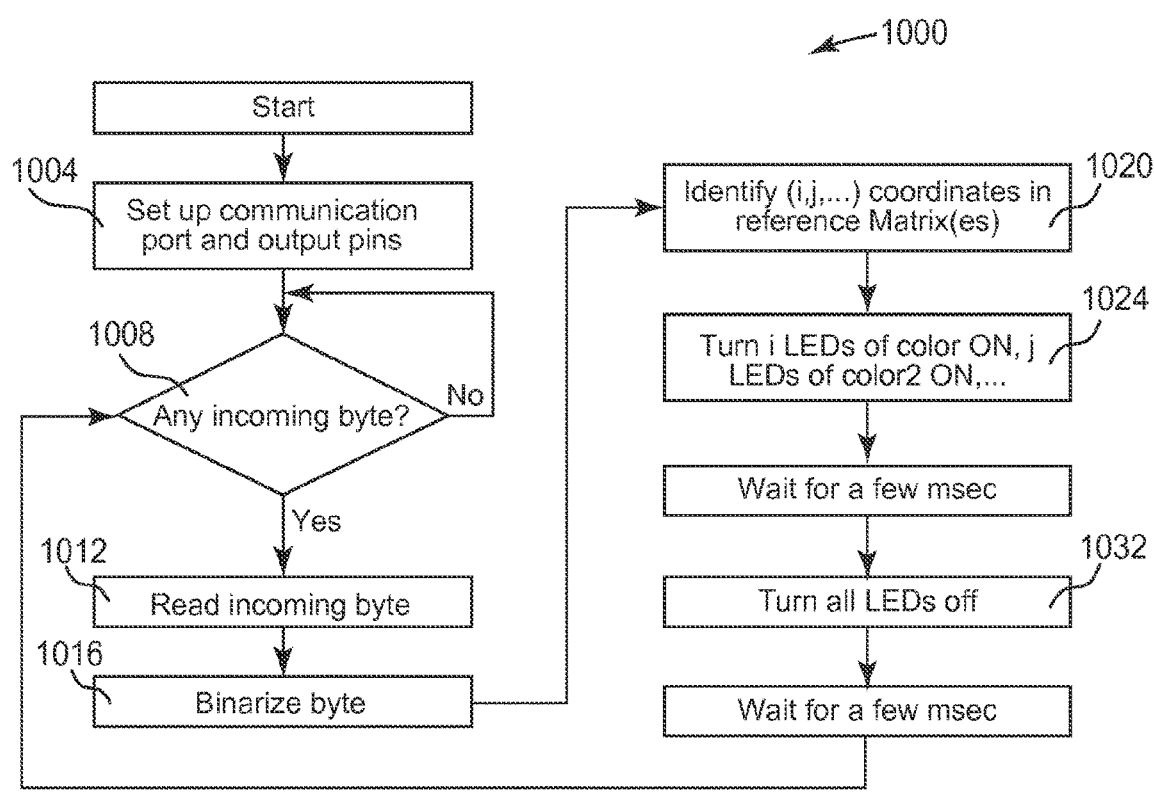
FIG. 10A illustrates an example flow diagram of a VLC transmission method according to the system shown in FIG. 6.

FIG. 10A illustrates a flow diagram of a VLC transmission method 1000 according to an example embodiment of the present invention. As a first step 1004, the computer device 308 is communicatively coupled to the processing module 316 of the transmitter 304 for transmitting the data to the processing module 316 for processing. At step 1008, the processing module 316 listens/waits for incoming data in the form a series of bytes of data. Once an incoming byte is detected, the incoming byte is read at step 1012 and then the processing module 316 binarizes the byte into a binary bit representation at step 1016. At step 1020, the processing module 316 is operable to identify the coordinate (i, j) of the binary bit representation in the predetermined reference matrix 604 matching the binary bit representation of the data obtained. Based on the coordinate obtained, at step 1024, the processing module 316 is configured to turn on i+1 number of LEDs 324 of a first color (e.g., green) and j+1 number of LEDs 324 of a second color (e.g., red). This modulated state of the LEDs 324 is then held for a predetermined short period of time (e.g., a few milliseconds) before all the LEDs are switch to an OFF state at step 1032. After another predetermined short period of time (e.g., a few milliseconds), the VLC transmission method 1000 returns to the step 1008 where the processing module 316 listens/waits for the next incoming byte.

Figure 10B:
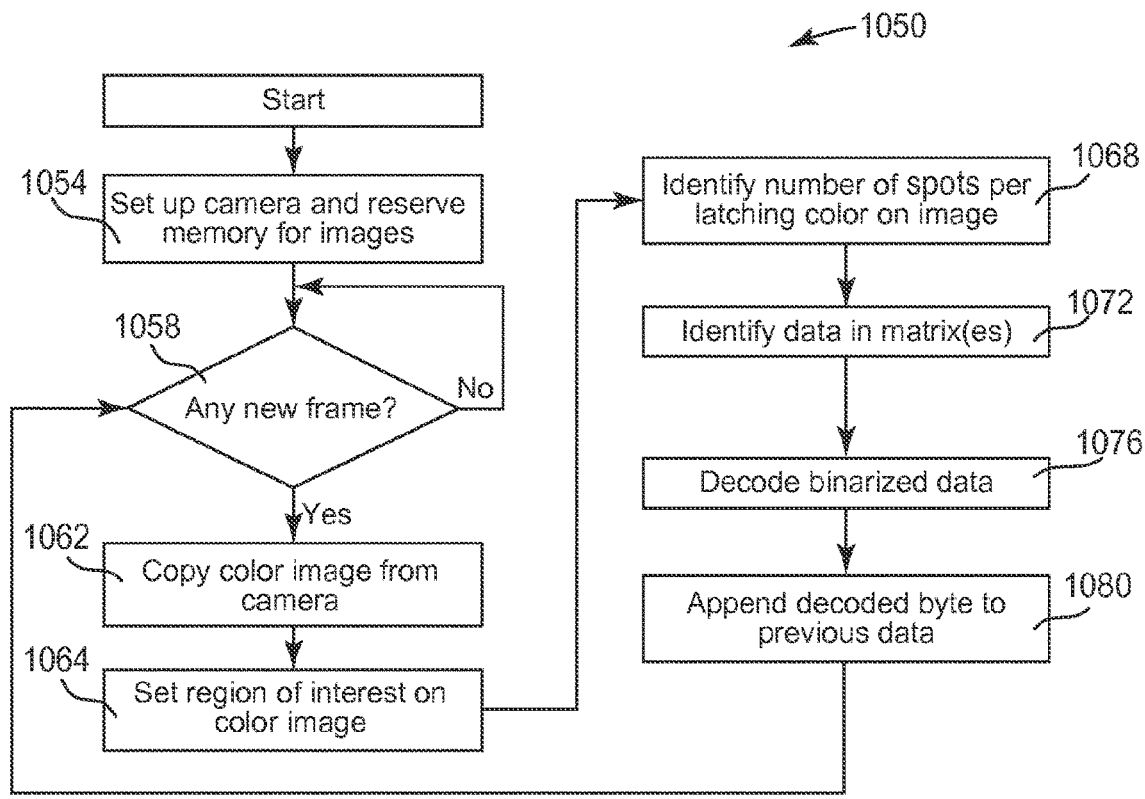
FIG. 10B illustrates an example flow diagram of a VLC receiving method according to the system shown in FIG. 6.

FIG. 10B illustrates a flow diagram of a VLC receiving method 1050 in the example embodiment. As a first step 1054, the receiving module 358 (e.g., an image capturing module) is initiated/set up for receiving the visible light signal 350 and spaces in the storage module 176 (e.g., ROM and/or RAM memory) are allotted/reserved for storing the visible light signal 350. Then at step 1058, the decoding module 172 listens/waits for an incoming frame of the visible light signal 350 detected by the receiving module 358. Once a new frame is detected, the incoming frame is read from the receiving module 358 at step 1062 and a region of interest corresponding to the capture region 366 is set containing one or more light spots 362 detected at step 1064. Then, the light spots 362 are decoded at step 1068 by identifying/determining the number of light spots 362 of each color. Once the number of light spots 362 of each color is determined, the binary bit representation of the data transmitted can be determined at steps 1072 and 1076 by referring to the reference matrix 604 as described hereinbefore. The decoded byte of data is then appended to any previously decoded byte if available/appropriate and then the receiving method 1050 returns to the step 1058 where the decoding module 172 listens/waits for the next frame from the receiving module 358.

In an embodiment, there is provided a plurality of available reference matrices 1104, 1108 based on which the data can be encoded/decoded. By way of examples only, FIGS. 11A and 11B illustrate two example available reference matrices 1104, 1108, each comprising a predetermined 4×4 array of binary bit representations, used to encode/decode a byte of data. For example, a first reference matrix 1104 may be used to encode/decode the seventh to the fourth bits of the binary bit representation and a second reference matrix 1108 may be used to encode/decode the third to the zeroth bits of the same binary bit representation. In particular, the first reference matrix 1104 has rows 1105 associated with a first color (e.g., red (R)) and columns 1106 associated with a second color (e.g., green (G)), and the second reference matrix 1108 has rows 1109 associated with a third color (e.g., yellow (Y)) and columns 1110 associated with a fourth color (e.g., light blue (LG)). Accordingly, for example, the binary bit representation "0010 1011" can be encoded by the processing module 316 at the transmitter 304 end by modulating the LEDs 324 such that there are 1 red LED, 3 green LEDs, 3 yellow LEDs and 4 light blue LEDs in the ON state as illustrated in FIGS. 11C and 11D. In particular, 1 red LED and 3 green LEDs indicate the cell of the first reference matrix 1104 at coordinate (0, 2) which has a binary bit representation of "0010", and 3 yellow LEDs and 4 light blue LEDs indicate the cell of the second reference matrix 1108 at coordinate (2, 3) which has a binary bit representation of "1011". As can been seen from FIGS. 11C and 11D, the locations of the LEDs 324 (thus the layout of the LEDs 324) may be arranged as desired. An advantage with this embodiment is that half of the total number of LEDs are required by 2 reference matrices associated with 4 colors as compared with the embodiment of FIG. 9A which uses 1 reference matrix associated with 2 colors (i.e., 16 LEDs as compared with 32 LEDs). Accordingly, from this example, it can be appreciated that increasing the number of colors (and thus increasing the number of matrices) can reduce the total number of LEDs 324 required to be used.

Figure 12C:
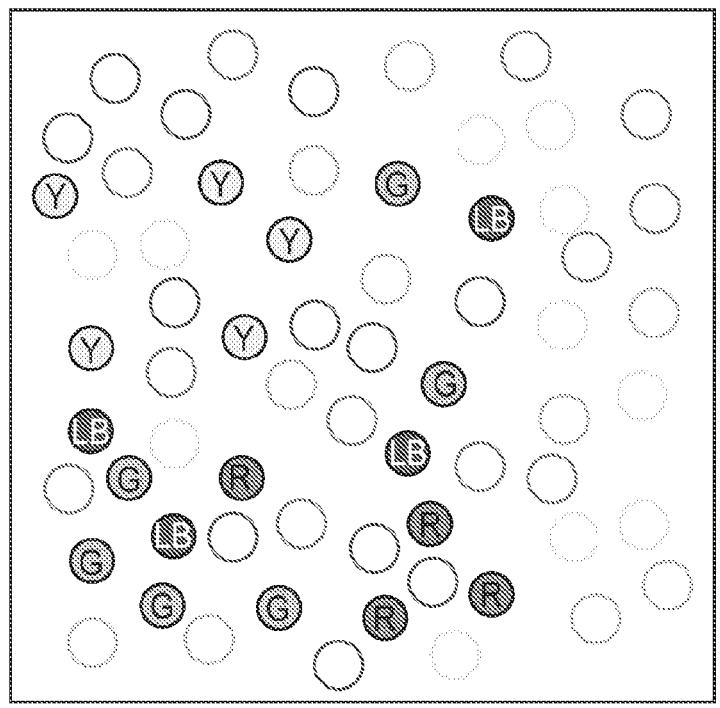
FIGS. 12C and 12D illustrate example arrangement of LEDs/light spots for transmitting/decoding an example binary bit representation based on the reference matrices shown in FIGS. 12A and 12B.
Figure 12D:
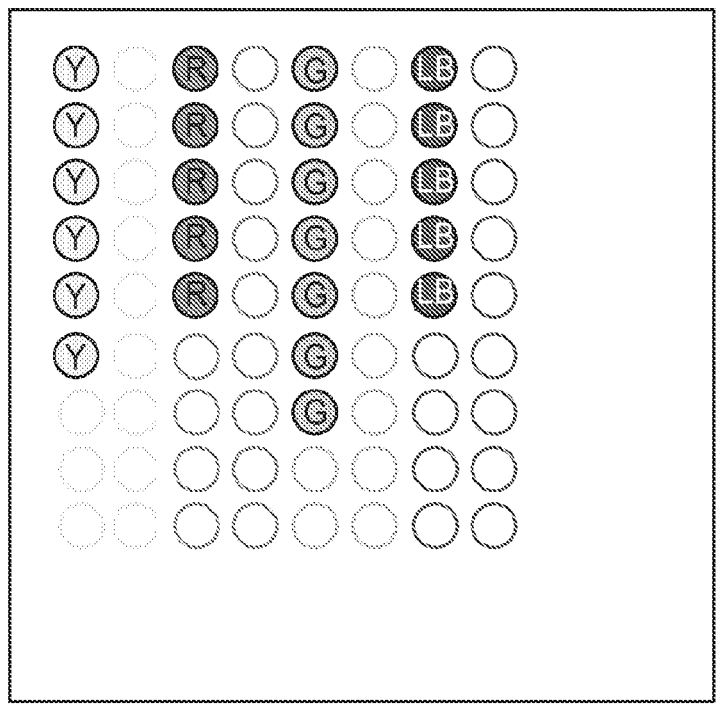

In another embodiment, instead of using two 4×4 reference matrices 1104, 1108 to encode one byte (8 bits) of data, two 8×8 reference matrices 1204, 1208 may be used to encode two bytes of data at once (i.e., per frame). By way of examples only, FIGS. 12A and 12B illustrate two example available reference matrices 1204, 1208, each comprising a predetermined 8×8 array of binary bit representations, used to encode two bytes of data at once. For example, a first reference matrix 1204 may be used to encode the fifteenth to the eighth bits of the binary bit representation and a second reference matrix 1208 may be used to encode the seventh to the zeroth bits of the binary bit representation. The first reference matrix 1204 has rows 1205 associated with the green (G) color and columns 1206 associated with the red (R) color. The second reference matrix 1208 has rows 1209 associated with the yellow (Y) color and columns 1210 associated with the light blue (LB) color. Accordingly, for example, the binary bit representation "0101 0011 0100 0011" can be encoded by the processing module 316 by modulating the LEDs 324 such that there are 6 green LEDs, 4 red LEDs, 5 yellow LEDs and 4 light blue LEDs in the ON state as illustrated in FIGS. 12C and 12D. In particular, 6 green and 4 red LEDs indicate the cell in first reference matrix 1204 at coordinate (5, 3) which has a binary bit representation of "0101 0011", and 5 yellow and 4 light blue LEDs indicate the cell in second reference matrix 1208 at coordinate (4, 3) which has a binary bit representation of "0100 0011". As can been seen from FIGS. 12C and 12D, the locations of the LEDs (thus the layout of the display) may be arranged as desired. An advantage with this embodiment is that the transmission rate has been increased to two bytes per frame. Accordingly, from this example, it can be appreciated that increasing the number of colors (and thus increasing the number of matrices) can increase the transmission rate of the transmitter 304.

Table 1 is provided below comparing the data speed (bit per frame) with number of LEDs, colors and matrices used.

TABLE 1

| Data speed per frame | Number of matrices | Number of colors | Number of LEDs per color | Total number of LEDs | m | n |
|---|---|---|---|---|---|---|
| 4 bits | 1 | 2 | 4 | 8 | 2 | 0 |
| 4 bits | 2 | 4 | 2 | 8 | 2 | 1 |
|  | 1 | 2 | 16 | 32 | 3 | 0 |
| 8 bits | 2 | 4 | 4 | 16 | 3 | 1 |
|  | 4 | 8 | 2 | 16 | 3 | 2 |
|  | 1 | 2 | 256 | 512 | 4 | 0 |

TABLE 1-continued

| Data speed per frame | Number of matrices | Number of colors | Number of LEDs per color | Total number of LEDs | m | n |
|---|---|---|---|---|---|---|
| 16 bits | 2 | 4 | 16 | 64 | 4 | 1 |
|  | 4 | 8 | 4 | 32 | 4 | 2 |
|  | 8 | 16 | 2 | 32 | 4 | 3 |
| $=2^m$ | $=2^n$ | $=2^{n+1}$ | $=2^n\sqrt{1+\sum_{i=0}^{i=2^{m-1}-1} 2^i}$ | $=2^{n+1}\times 2^n\sqrt{1+\sum_{i=0}^{i=2^{m-1}-1} 2^i}$ | m | n |

It will be appreciated that a minimum of two LEDs per color is required. Therefore, the number of matrices can be brought up to a value equal to the number of bits divided by two (2). The number of bits can be expressed as $2^m$ with m positive integer, the number of matrices can be written $2^m$ with n positive integer and $2^n \leq 2^{m-1}$, and the number of colors can be expressed as $2^{n+1}$ with n positive integer and $2^{n+1} \leq 2^m$. The number of LEDs per color can thus be expressed as $$2^n\sqrt{1+\sum_{i=0}^{i=2^{m-1}-1} 2^i}$$

with n and m positive integers, and the total number of LEDs can be determined as the number of colors multiplied by the number of LEDs per color. Accordingly, it can be deduced that the total number of $$LEDs = 2^{n+1} \times 2^n\sqrt{1+\sum_{i=0}^{i=2^{m-1}-1} 2^i}.$$

Therefore, the above Table 1 and equations enable a user to choose an appropriate solution based on the nature of the application, while being able to take into consideration the number of LEDs, the number of different colored LEDs and the speed of data transmission per frame.

Figure 13:
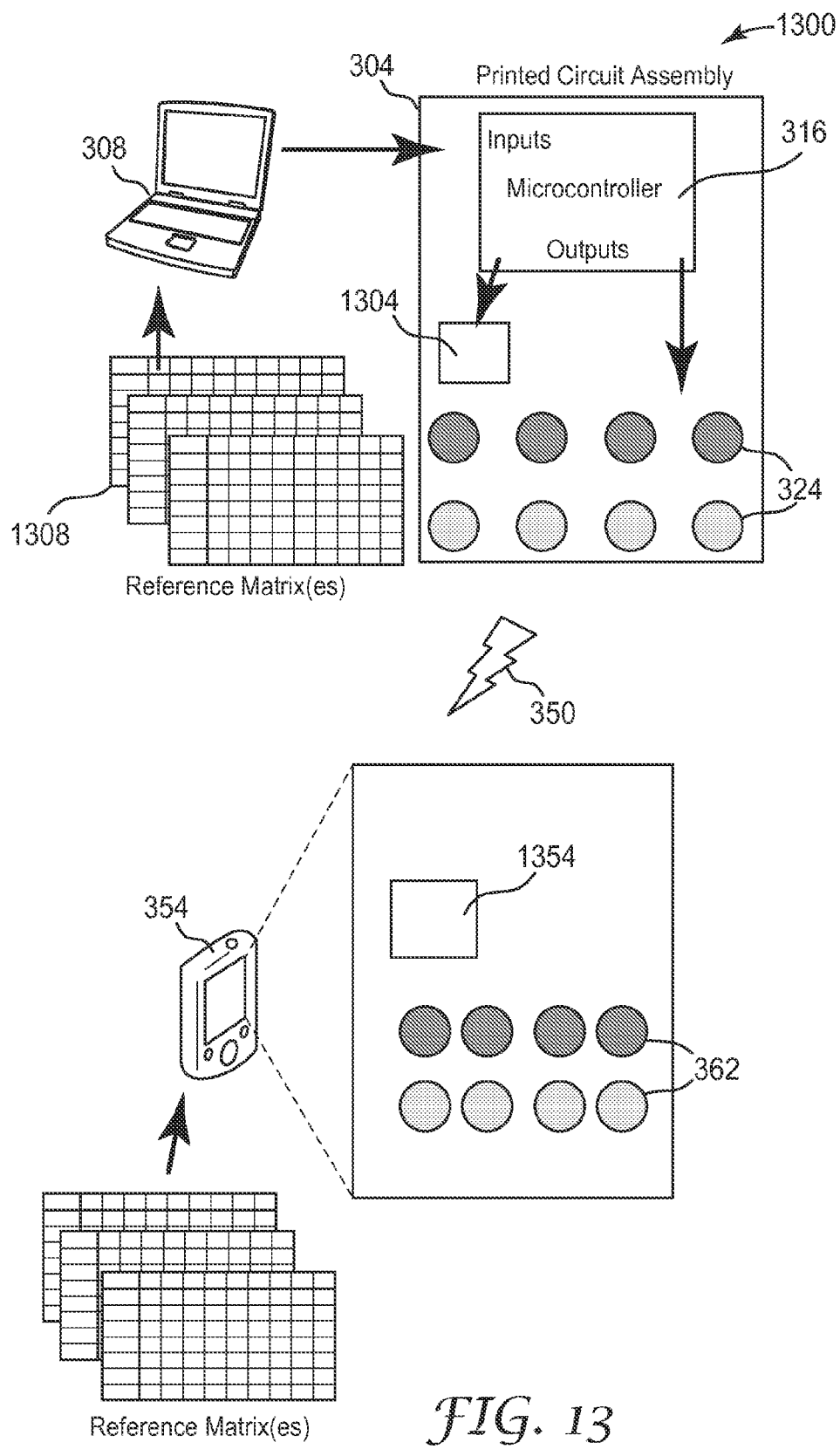
FIG. 13 depicts a schematic diagram generally illustrating a system 1300 for visible light communication according to another example embodiment of the present invention.

FIG. 13 depicts a schematic diagram generally illustrating a system 1300 for visible light communication according to another example embodiment of the present invention. The system 1300 is the same as the system 600 as described with reference to FIG. 6, except that a specific reference matrix indicator 1304 is provided for indicating the reference matrix 1308 used to encode the data from the computer device 308. It will be appreciated that the components/parts of the system 1300 that are the same as those in the system 600 are indicated by the same reference numbers, and may have the same construction and same function, unless otherwise specified. For illustration purposes, the reference matrix indicator 1304 is in the form of an LED emitting a predetermined color. However, it will be appreciated that the reference indicator 1304 may be in any other number of appropriate forms such as, for example, sound waves where a number of predetermined frequencies indicate a number of different reference matrices, respectively.

FIGS. 14A and 14B illustrate two example reference matrices 1404, 1408 each pre-associated with a unique color which can be referenced or indicated by the reference matrix indicator 1304. For example, a first reference matrix 1404 is associated with a first color (e.g., yellow (Y)) and a second reference matrix 1408 is associated with a second color (e.g., dark blue (DB)). Furthermore, the first and second reference matrices 1404, 1408 each has rows 1405, 1409 associated with a third color (e.g., green (G)) and columns 1406, 1410 associated with a fourth color (e.g., red (R)). Accordingly, at the transmitter 304 end, the reference matrix indicator 1304 will be controlled to emit a yellow color if the first reference matrix 1404 is used or a blue color if the second reference matrix 1408 is used to encode the data. At the receiver 354 end, if the light spot 1354 corresponding to the light emitted by the reference matrix indicator 1304 is detected to be yellow, the first reference matrix 1404 will be selected to decode the visible light signal 350, or if the light spot 1354 is detected to be blue, the second reference matrix 1408 will be selected to decode the visible light signal 350.

Figure 15A:
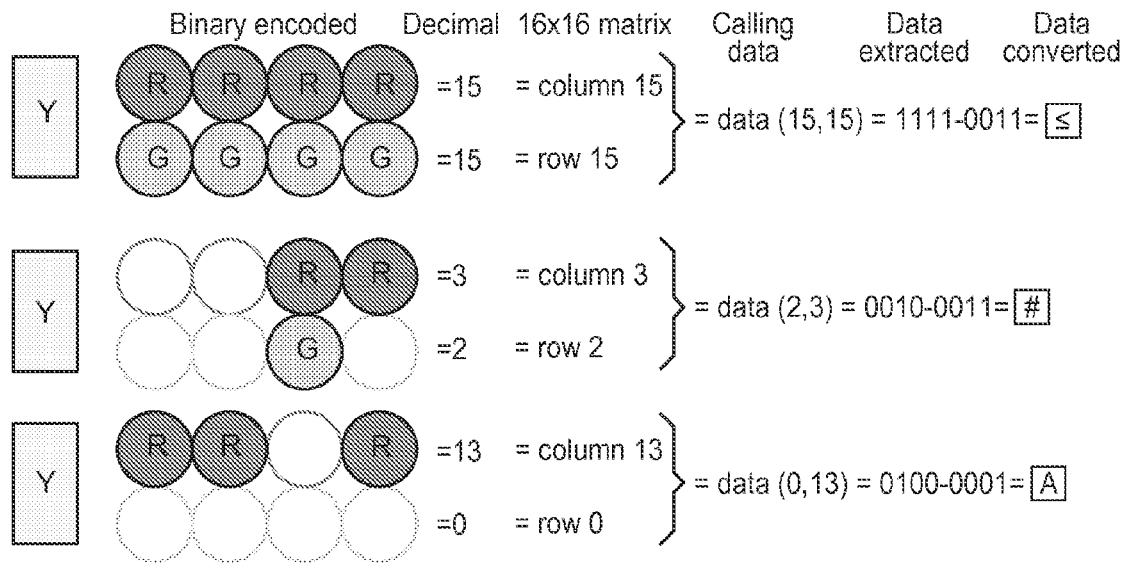
FIGS. 15A and 15B illustrate exemplary decoding processes for three exemplary characters according to the system shown in FIG. 13.

FIG. 15A illustrates the decoding process at the receiver 354 end for three exemplary characters "≤", "#" and "A" transmitted by the transmitter 304. In the example, for the character "≤", the reference matrix indicator 1304 was modulated to emit the yellow color to indicate that the first reference matrix 1404 was used to encode the character. Furthermore, referring to the reference matrix 1404, the processing module 316 modulates 15 red and 15 green LEDs to be in the ON state to represent the binary bit representation of "1111 0011" for the character "≤". At the receiver 354 end, light spots consisting of 1 yellow color, 15 red colors, and 15 green colors are detected. Based on the colors of the light spots detected, the decoding module 172 is operable to select the first reference matrix 1404 (corresponding to the yellow color), and decode the 15 red and 15 green colored light spots 362 using the first reference matrix 1404. In particular, the cell in the first reference matrix 1404 at the intersection of the fifteenth row and the fifteenth column is identified and its value ("1111 0011") obtained as the binary bit representation of the decoded byte. This binary bit representation can then be converted to the character "≤". The remaining exemplary characters "#" and "A" can be encoded/decoded in the same manner as the character "≤" as illustrated in FIG. 15A and thus will not be repeated for conciseness.

Figure 15B:
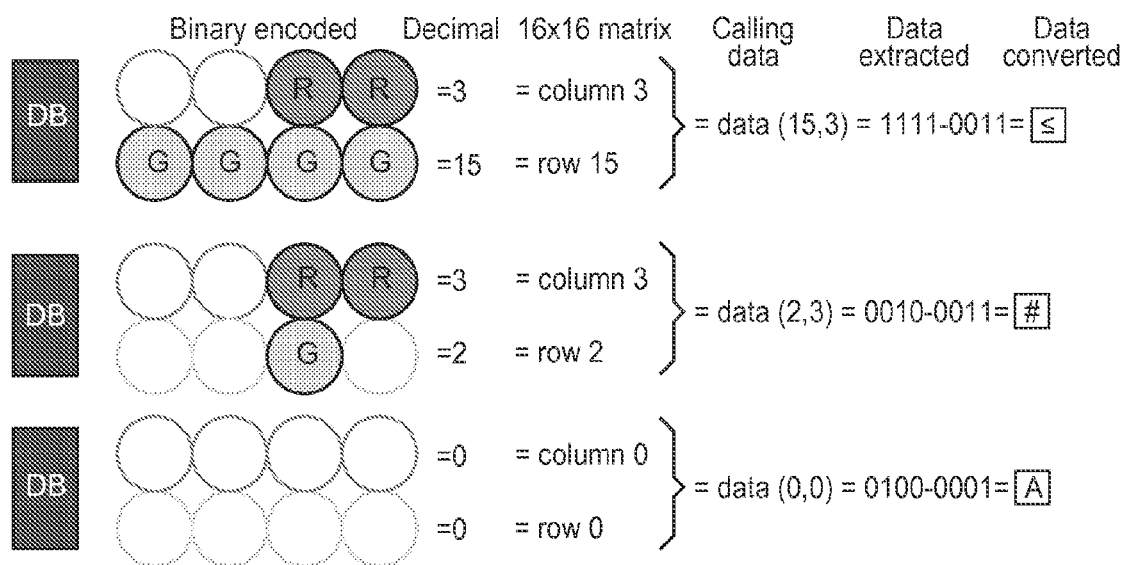

FIG. 15B illustrates the same decoding process at the receiver 354 end for the same three exemplary characters "≤", "#" and "A", but for the case where the reference matrix indicator 1304 was modulated to emit the dark blue color for indicating that the second reference matrix 1408 was used to encode the characters. From FIGS. 15A and 15B, it can be seen that the same characters can be encoded differently (i.e., can be represented by different numbers of red and green LEDs 324) depending on the reference matrix used to encode the characters (as indicated by the reference matrix indicator 1304). Advantageously, no modifications are required at the receiver 354 end to correctly decode the encoded visible light signal 350 despite the same characters being represented by different numbers of red and green LEDs 324. Furthermore, by using both reference matrices 1404 and 1408 at different times when encoding the data, the encoded data can only be correctly decoded at the receiver 354 end if the receiver 354 has both reference matrices 1404, 1408 and knows when to use the correct reference matrix for each byte of data. This therefore provides a form of security in the data transfer in that a third party cannot correctly decode the data received without having the correct reference matrices 1404, 1408.

Figures 16A, 16B:
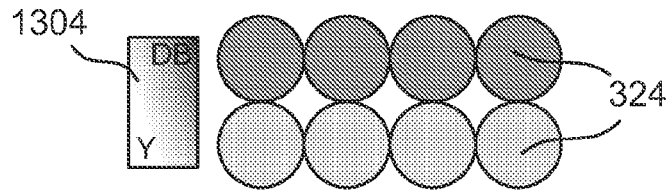
FIGS. 16A and 16B illustrate an example of transmitting/decoding the word "Hello" according to the system shown in FIG. 13.

For clarity and illustration purposes, an example will now be described with reference to FIGS. 16A and 16B for transmitting the same word "Hello" as in FIGS. 4B and 9B. Some of the LEDs 324 at the transmitter 304 end are schematically shown in FIG. 16A as well as the reference matrix indicator 1304. In FIG. 16B, each character of the word is binarized into a binary bit representation based on the ASCII standard and transmitted sequentially (i.e., one character/byte of data at a time). As illustrated, the character "H" is converted into a binary bit representation of "0100 1000". For this character, since the first reference matrix 1404 is used to encode the character, the reference matrix indicator 1304 is modulated to emit the yellow color. Based on the first reference matrix 1404, to indicate the binary bit representation of "0100 1000", zero red LED and zero green LED are modulated by the processing module 316 to be in the ON state. For example, for the character "o", the character is converted into a binary bit representation of "0110 1111". For this character, since the second reference matrix 1408 is used to encode the character, the reference matrix indicator 1304 is modulated to emit the dark blue color. Based on the second reference matrix 1408, to indicate the binary bit representation of "0110 1111", 15 red LEDs and zero green LED are modulated by the processing module 316 to be in the ON state. The remaining characters "e", "l" and "l" are encoded/decoded in the same manner as illustrated in FIG. 16B and thus will not be repeated for conciseness.

Figure 17A:
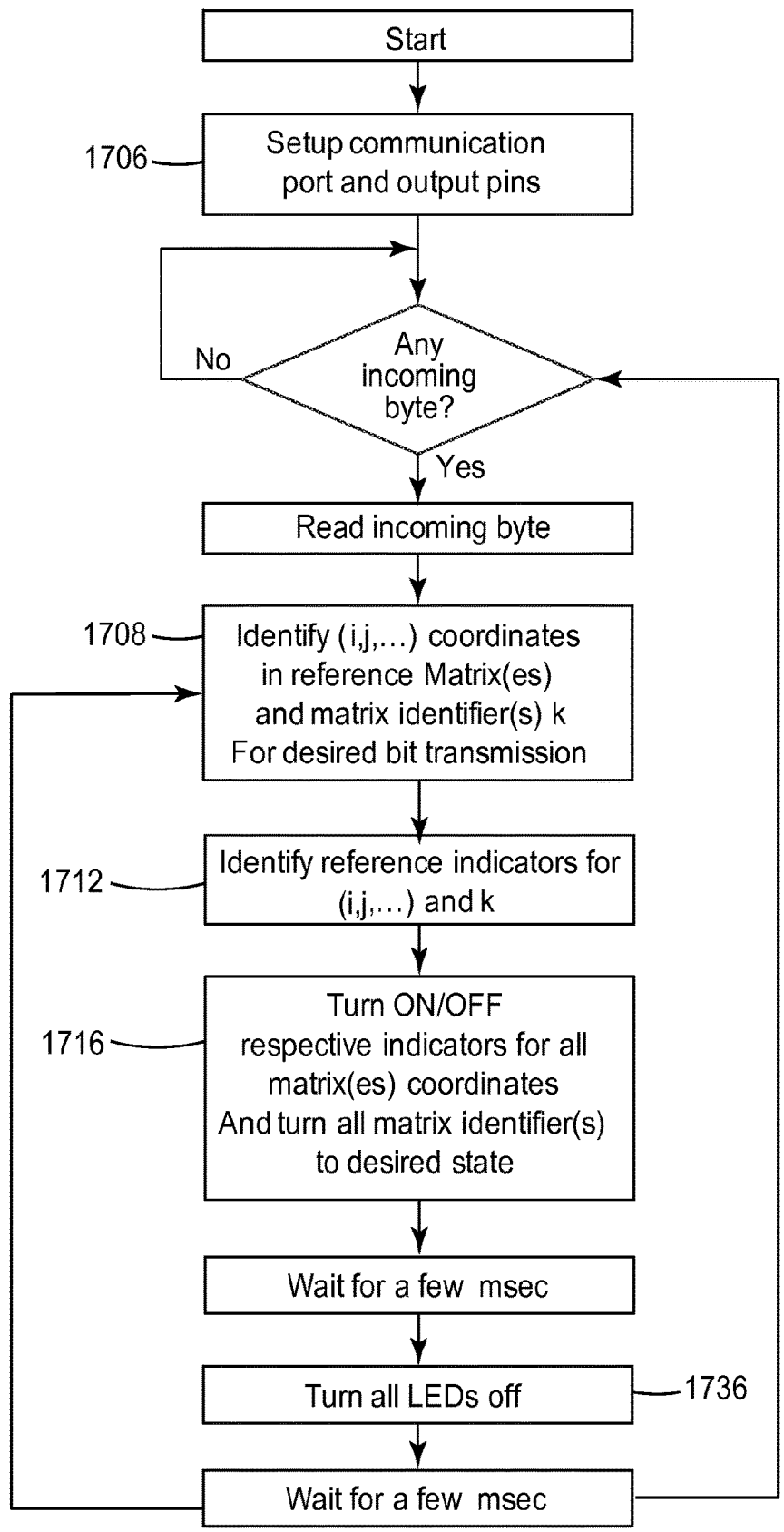
FIG. 17A illustrates an example flow diagram of a VLC transmission method according to the system shown in FIG. 13.

FIG. 17A illustrates a flow diagram of a VLC transmission method according to an example embodiment of the present invention. As a first step 1706, the computer device 308 is communicatively coupled to the processing module 316 for transmitting the data to the processing module 316 of the transmitter 304 for processing. At step 1708, the processing module 316 is operable to identify the reference matrix 1308 to be used to encode the data and the coordinate (i, j) of the binary bit representation in the selected reference matrix 1308 matching the binary bit representation of the data/character obtained. The values of coordinate and reference matrix indicator 1304 are linked to their respective indicators, and the reference matrix indicator's state 1304 is identified at step 1712. At step 1716, the respective indicators for all matrix(es) coordinates and matrix indicators are turned to their desired states according to the coordinates of the data to transmit and the matrix(es) chosen. Based on the coordinate obtained, the processing module 316 is configured to turn on i+1 number of LEDs 324 of a first color (e.g., green) and j+1 number of LEDs 324 of a second color (e.g., red). This modulated state of the LEDs 324 is then held for a predetermined short period of time (e.g., a few milliseconds) before all the LEDs are switch to an OFF state at step 1736. After another predetermined short period of time (e.g., a few milliseconds), the VLC transmission method 1700 returns to the step 1708 for the next data/character.

Figure 17B:
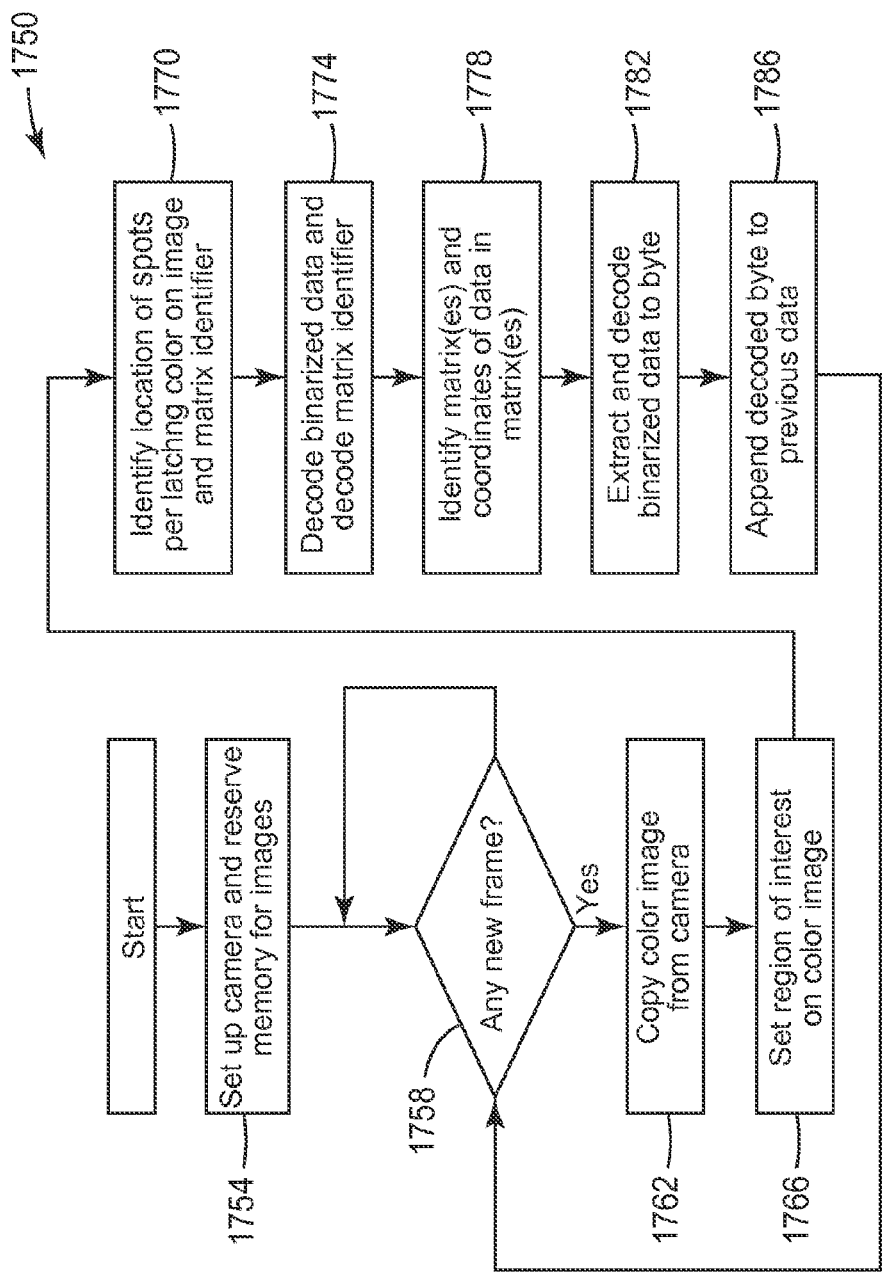
FIG. 17B illustrates an example flow diagram of a VLC receiving method according to the system shown in FIG. 13.

FIG. 17B illustrates a flow diagram of a VLC receiving method 1750 according to an example embodiment of the present invention. As a first step 1754, the receiving module 158 (e.g., an image capturing module) is initiated/set up for receiving the visible light signal 350 and spaces in the storage module 176 (e.g., ROM and/or RAM memory) are allotted/reserved for storing the visible light signal 350. Then at step 1758, the decoding module 172 listens/waits for an incoming frame of the visible light signal 350 detected by the receiving module 358. Once a new frame is detected, the incoming frame is read from the receiving module 358 at step 1762 and a region of interest corresponding to the capture region 366 is set containing one or more light spots 362 detected at step 1766. Then, the data coordinate and reference matrix indicator 1354 are decoded at step 1770 and 1774 by identifying/determining the number of light spots 362 of each color as described hereinbefore. Once the data coordinate and reference matrix indicator 1354 are decoded, the binary bit representation of the data transmitted can be determined at steps 1778 and 1782 using the reference matrix 1308 identified/referred to by the reference matrix indicator 1354 as described hereinbefore. The decoded byte of data is then appended to any previously decoded byte at step 1786 if available/appropriate and then the receiving method 1750 returns to the step 1758 where the decoding module 316 listens/waits for the next frame from the receiving module 358.

In another embodiment, the binary bit representation in a predetermined reference matrix 1804, 1808 is indicated or referenced based on a first set 1904 of LEDs modulated to indicate the row 1805, 1809 and a second set 1908 of LEDs modulated to indicate the column 1806, 1810 of the predetermined reference matrix 1804, 1808 at which the binary bit representation is located. That is, the coordinate of the reference matrix 1804, 1808 at which the binary bit representation is located is encoded/converted into binary numbers. For example, the first set of LEDs 1904 are modulated to indicate the row coordinate, and the second set of LEDs 1908 are modulated to indicate the column coordinate of the cell in the predetermined reference matrix 1804, 1808 containing the binary bit representation of the data.

Figure 19:
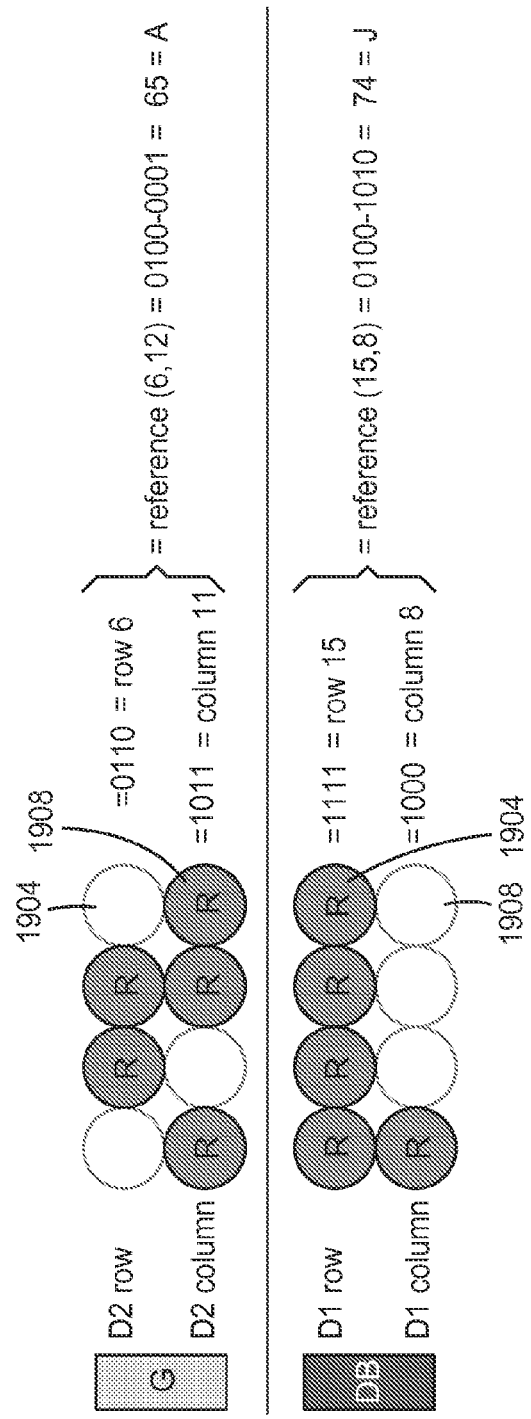
FIG. 19 illustrates an example decoding process for two exemplary characters based on the reference matrices shown in FIGS. 18A and 18B.

FIGS. 18A and 18B illustrate two example reference matrices 1804, 1808, each comprising a predetermined 16×16 array of binary bit representations, based on which the data can be encoded in this example embodiment. For example, the reference matrix 1804 is associated with a first color (e.g., dark blue) whereas the reference matrix 1808 is associated with a second color (e.g., green). FIG. 19 illustrates the decoding process at the receiver 354 end for two exemplary characters "A" and "J". In the example, for the character "A", the reference matrix indicator 1304 was modulated to emit the green color to indicate that the first reference matrix 1804 was used to encode the character. Furthermore, referring the first reference matrix 1804, the processing module 316 modules the second and third LEDs of the first set 1904 of LEDs to be in the ON state for indicating the sixth row (i.e., binary number of 6=0110) and the first, third, and fourth LEDs of the second set 1908 of LEDs to be in the ON state for indicating the eleventh column (i.e., binary number of 11=1011) to indicate the binary bit representation "0100 0001" at coordinate (6, 11). The character "J" can be encoded by modulating the reference matrix indicator 1304 to be dark blue, the first set 1904 of LEDs to indicate the fifteenth row and the second set 1908 of LEDs to indicate the eighth column of the reference matrix 1808, thereby indicating the binary bit representation "0100 1010". In this example embodiment, the rows and columns of both reference matrices 1804, 1808 are all associated with the same color (e.g., red). However, in this example embodiment, the positions of the LEDs 324 are predetermined in order to differentiate the LSB to the MSB for determining the rows and columns of the binary bit representation in the reference matrix. For example, for the first set 1904 of LEDs, the four LEDs shown are at predetermined positions such that the leftmost LED indicates the MSB and the rightmost LED indicates the LSB.

It will be appreciated that one can use multiple smaller matrices to describe an 8 bit data and dynamically change the content of each matrix independently from the other. Since the matrices are smaller than the 16×16 initial matrices, the storage space required will be smaller. For example, if the user wishes to use only two sets of 4×4 matrices per coordinates, there will need to be two references to indicate which pair of matrices is being used. Additionally, although the present description focuses on two dimensional matrices having solely rows and columns (e.g. 16×16, 4×4), it will be appreciated that the concepts described herein can be expanded to apply to three dimensional matrices, four dimensional matrices, n dimensional matrices (where n may be any appropriate integer), and the like.

Figure 20A:
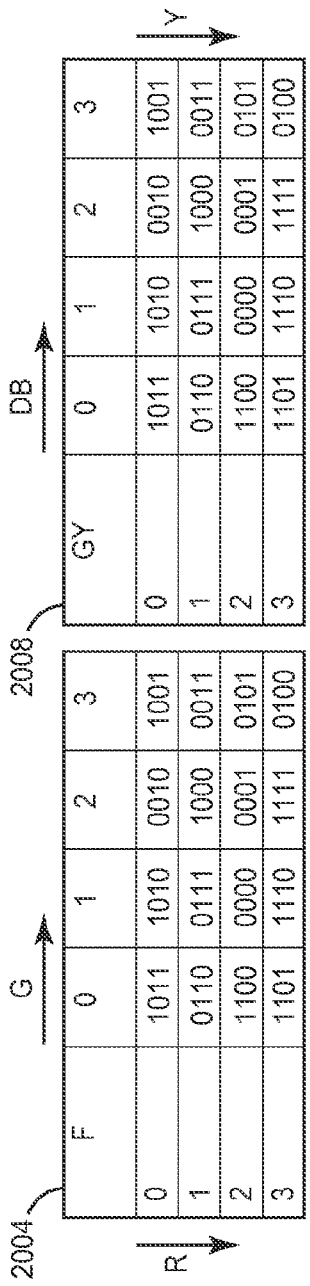
FIG. 20A illustrates two example reference matrices based on which data may be encoded/decoded according to another embodiment of the present invention.
Figure 20B:
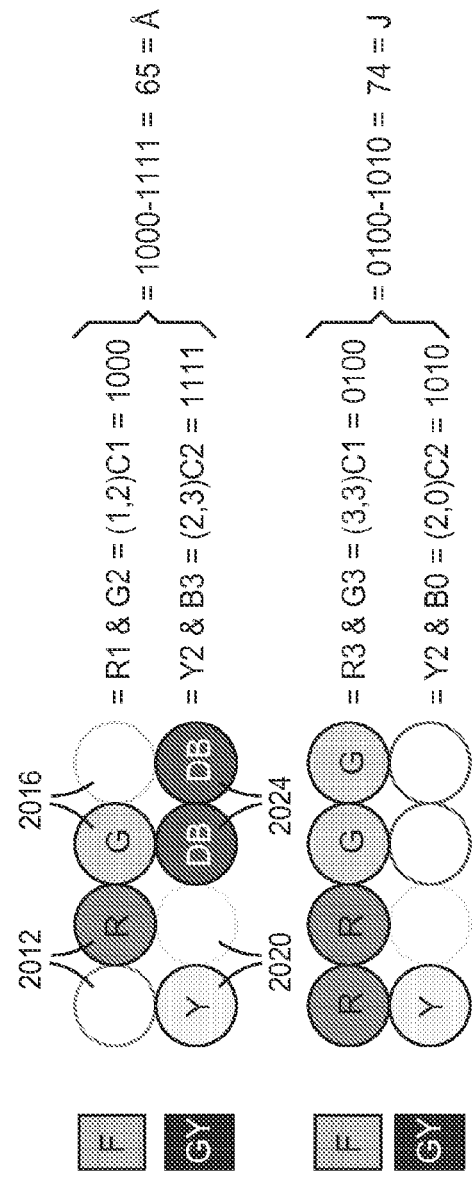
FIG. 20B illustrates an example decoding process for two exemplary characters based on the reference matrices shown in FIG. 20A.

FIGS. 20A and 20B illustrate a variation of the embodiment described with reference to FIGS. 18 and 19. In particular, instead of having a first set 1904 of LEDs indicating the row and a second set 1908 of LEDs indicating the column of the desired binary bit representation in the reference matrix, there are provided four sets of LEDs. In particular, a first set 2012 and a second set 2016 of LEDs are assigned to indicate the row (associated with a first color, e.g., red) and column (associated with a second color, e.g., green) of the first reference matrix 2004 (associated with a fifth color, e.g., fuchsia (F)), respectively, containing the binary bit representation of the seventh bit to the fourth bit, and a third set 2020 and a fourth set 2024 of LEDs are assigned to indicate the row (associated with a third color, e.g., yellow) and column (associated with a fourth color, e.g., dark blue) of the second reference matrix 2008 (associated with a sixth color, e.g., grey), respectively, containing the binary bit representation of the third to the zeroth bit. In an example, for the character "Å", the reference matrix indicator 1304 was modulated to emit the fuchsia color to indicate that the first reference matrix 2004 was used to encode the character. Furthermore, referring the first reference matrix 2004, the processing module 316 modules the first and second sets of LEDs as shown in FIG. 20B to indicate the seventh bit to the fourth of the binary bit representation (e.g., "1000") and the third and fourth sets of the LEDs as shown in FIG. 20B to indicate the third to the zeroth bit of the binary bit representation (e.g., "1111"). This result can then be combined to produce the binary bit representation "1000 1111" which can be converted to the character "Å". The character "J" can be encoded/decoded in the same manner as shown in FIG. 20B and thus will not be repeated for conciseness. This example embodiment is advantageous over the embodiment of FIGS. 18 and 19 in that the LED layout is more flexible since each row and column of each reference matrix is associated with a unique color and thus they do not need to depend on predetermined positions of the LEDs.

Figure 21A:
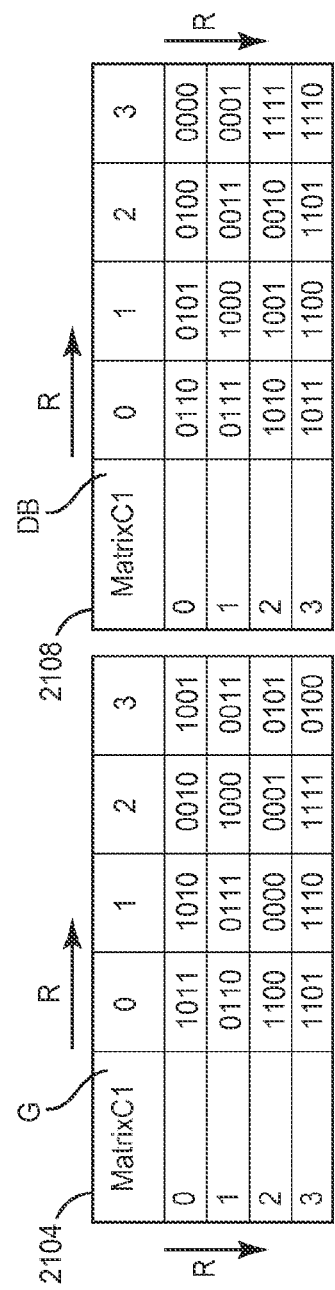
FIG. 21A illustrates two example reference matrices based on which data may be encoded/decoded according to another embodiment of the present invention.
Figure 21B:
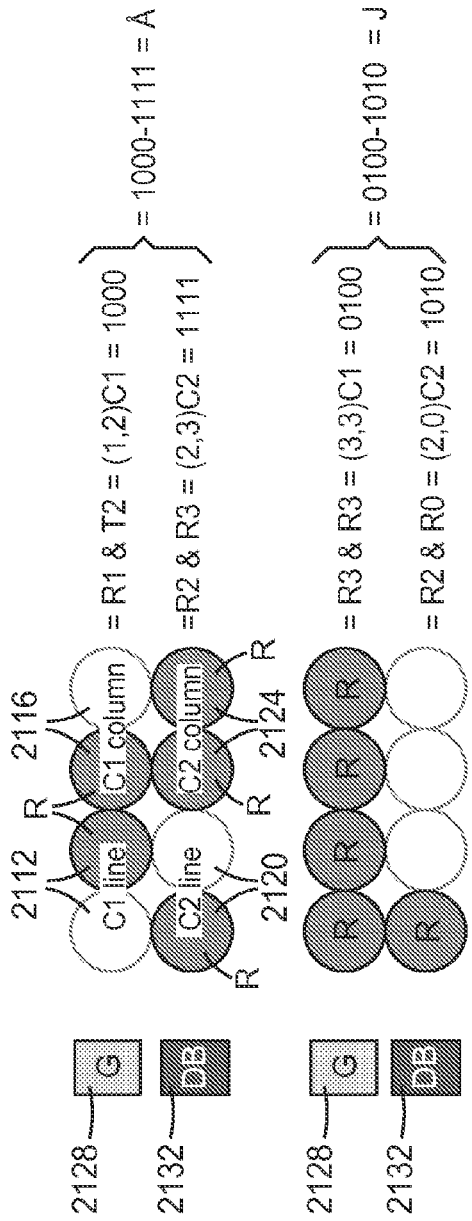
FIGS. 21B and 21C illustrate exemplary decoding processes for two exemplary characters based on the reference matrices shown in FIG. 21A.
Figure 21C:
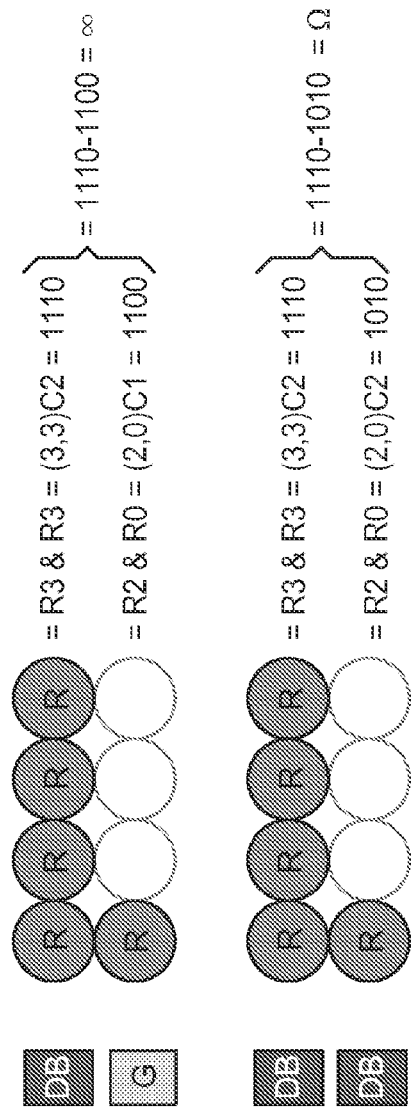

FIGS. 21A to 21C illustrate a variation of the embodiment described with reference to FIG. 20. In particular, instead of relying on different colors to differentiate each row and columns of each reference matrix, the positions of the LEDs are predetermined to correspond to the row and column of each reference matrix 2104, 2108. For example, as illustrated in FIG. 21A, the rows and columns of both reference matrices 2104, 2108 are associated with a single color, e.g., red. In particular, by identifying/associating the rows of reference matrix 2104 with the first set (e.g., first two bits) 2112 of LEDs, the columns of reference matrix 2104 with the second set (e.g., next two bits) 2116 of LEDs, the rows of matrix 2108 with the third set (e.g., first two bits) 2120 of LEDs, and columns of matrix 2108 with the fourth set (e.g., next two bits) 2124 of LEDs, it is possible to transmit all four coordinates of two four-bit numbers to identify rows and columns of two different matrices 2104, 2108. Once all four coordinates have been transmitted, the 8-bit binary number can be extracted from both reference matrices 2104, 2108. The two reference matrices 2104, 2108 can be differentiated by being associated with a different color reference matrix indicator 1304.

In this example embodiment, the data is decoded based on the combination of both reference matrices 2104, 2108, with for example, reference matrix 2104 indicating the first four bits and reference matrix 2104 indicating the last four bits of the binary bit representation. Content of the reference matrices 2104, 2108 can be dynamically changed to ensure a more secure transmission by using the reference matrix indicator 1304 accordingly. FIG. 21B shows as an example of how two 8-bit characters (Å and J) may be encoded by using references matrices 2104 and 2018 throughout the transmission (i.e., the colors (e.g., blue and green) of the reference matrix indicators 2120 remain the same). As illustrated, the character "Å" can be encoded by modulating a first reference matrix indicator 2128 to emit the green color, the first set 2112 and second set 2116 of LEDs to indicate the coordinate (e.g., (1, 2)) of the reference matrix 2104 containing the first four bits (e.g., "1000"), and modulating a second reference matrix indicator 2132 to emit the dark blue color and the third set 2120 and fourth set 2124 of LEDs to indicate the coordinate (e.g., (2, 3) of the reference matrix 2108 containing the next four bits (e.g., "1111)". The results can then be combined to produce the binary bit representation "1000 1111" which can be converted to "Å". The character "J" can be encoded/decoded in the same manner as shown in FIG. 21B and thus will not be repeated for conciseness.

FIG. 21C illustrates the encoding/decoding process for another two characters "∞" and "Ω" in this example embodiment. In particular, it is demonstrated a different character "Ω" can be transmitted by modulating the LEDs in the same manner as for the character "J" shown in FIG. 21B by adjusting the color emitted by the reference matrix indicator 2128. In this example embodiment, it is the positions of the color spots that define the order of the coordinates being transmitted and the reference matrix indicator 2128, 2132 that indicates which reference matrix these coordinates refer to.

Table 2 below provides a summary of the number of different matrices possible depending on the matrix's size and the desired data transmission per frame. In general, the more different matrices exist, the more secure the transmission becomes.

TABLE 2

| Matrix size | Desired data transmitted size (bit) | Number of matrices used per data transmitted | Number of different data per matrix | Number of possible different matrices per matrix | Number of different matrix possibilities for each set of data sent |
|---|---|---|---|---|---|
| 2 × 2 | 2 | 1 | 4 | 24 | 24 |
|  | 4 | 2 |  |  | 48 |
|  | 8 | 4 |  |  | 96 |
|  | 16 | 8 |  |  | 192 |
| 4 × 4 | 4 | 1 | 16 | 20 922 789 888 000 | 20 922 789 888 000 |
|  | 8 | 2 |  |  | 41 845 579 776 000 |
|  | 16 | 4 |  |  | 83 691 159 552 000 |
| 16 × 16 | 8 | 1 | 256 | $8.578 \times 10^{506}$ | $8.578 \times 10^{506}$ |
|  | 16 | 2 |  |  | $17.156 \times 10^{506}$ |
| m × m | $2^n$ | $2^{n-1}$ | $m^2$ | $m^2!$ | $m^2! \times 2^{(n-1)}$ |

If the reference matrix is an m by m matrix, and the desired data transmitted size is $2^n$ then the quantity of data per matrix will be $m^2$, the number of different matrices per matrix will be $m^2!$ and thus, the number of different matrix possibilities for each set of data sent will be $m^2! \times 2^{(n-1)}$.

Figure 22:
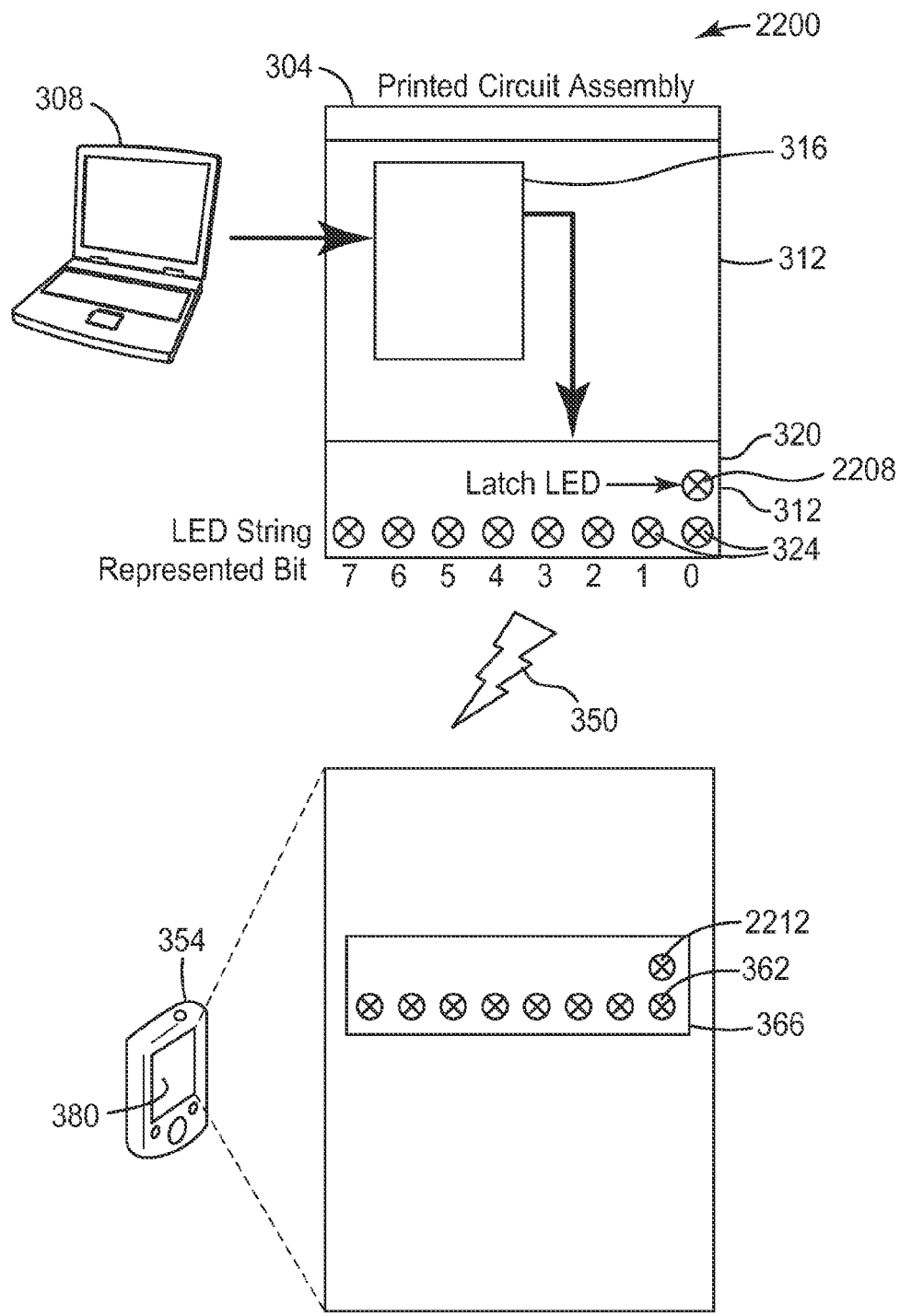
FIG. 22 depicts a schematic diagram generally illustrating a system for visible light communication according to an example embodiment of the present invention.

FIG. 22 depicts a schematic diagram generally illustrating a system 2200 for visible light communication according to an example embodiment of the present invention. The system 2200 is the same as the system 300 as described with reference to FIG. 3, except that the arrangement/layout of the LEDs is predetermined and the position of each LED 324 is pre-assigned to correspond to the respective nth bit of the binary bit representation such that each nth bit of the binary bit representation is represented by a unique position. It will be appreciated that the components/parts of the system 2200 the same as those in the system 300 are indicated by the same reference numbers, and may have the same construction and same function, unless otherwise specified.

Figures 23A, 23B:
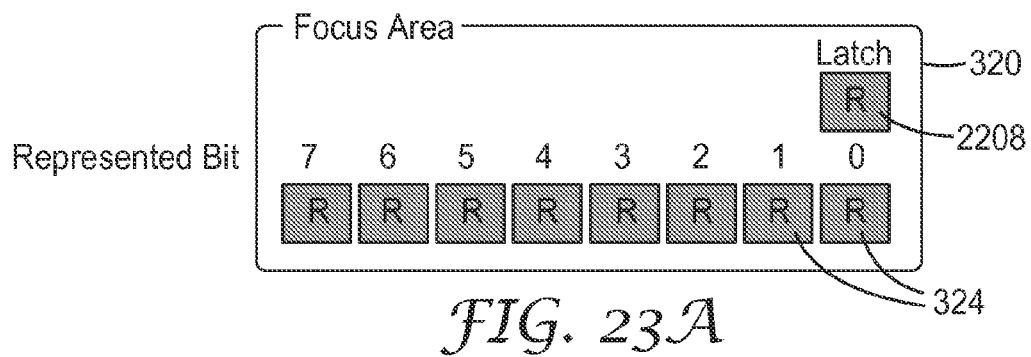
FIG. 23A illustrates an example of the LEDs respectively pre-assigned to each bit of the binary bit representation.
FIG. 23B illustrates an example of transmitting/decoding the word "Hello" according to the system shown in FIG. 22.

In particular, in this example embodiment, each LED 324 is configured to be able to emit at least two colors, e.g., a first color such as blue and a second color such as red, whereby each color represents a binary value (i.e., "0" or "1"). For example, the first color may be pre-assigned to represent the binary value "0" and the second color may be pre-assigned to represent the binary value "1". Furthermore, the arrangement of the LEDs 324 within the capture region 320 is predetermined and the position of each LED 324 is pre-assigned to correspond to the respective nth bit of the binary bit representation. For example, as illustrated in FIG. 23A, the LEDs 324 are arranged in a row in the capture region 320 whereby the position of the leftmost LED to the rightmost LED 324 are respectively pre-assigned to correspond to the seventh bit to the zeroth bit of the binary bit representation of the data. Accordingly, at the transmitter 304 end, the data can be encoded by the processing module 316 by modulating the LEDs 324 between the first color and the second color based on the binary bit representation of the data. At the receiver 354 end, the data can be decoded by the decoding module 172 based on the position of each light spot 362 received (for indicating which bit) and its color (for indicating the value of the bit).

In the example embodiment, a latch indicator 2208 is provided in the capture region 320 and is configured to toggle between two colors for indicating the next byte/string of data. For example, the latch indicator 2208 may be provided in the form of an LED.

For clarity and illustration purposes, an example will now be described with reference to FIGS. 23A and 23B for transmitting the same word "Hello" as in FIG. 4B. The LEDs 324 at the transmitter 304 end is shown in FIG. 23A.

In FIG. 23B, each character of the word is binarized into a binary bit representation based on the ASCII standard and transmitted sequentially (i.e., one byte/character of data at a time). As illustrated, the character "H" is converted into a binary bit representation of "0100 1000", and based on the above-mentioned pre-assigning information as shown in FIG. 23A, the LEDs 324 pre-assigned to the sixth and the third bits are modulated to emit the first color (e.g., red to indicate the binary value "1") and the seventh, fifth, fourth, second, first, and zeroth bits are modulated to emit the second color (e.g., blue to indicate the binary value "0"). Furthermore, the latch indicator 2208 is modulated to emit a first color (e.g., blue) for the character "H". As shown, for the next character "e", the latch indicator 2208 toggles to emit a second color (e.g., red). The latch indicator 2208 is configured to continue to toggle between the first and second colors for indicating the next character for the remaining characters. At the receiver 354 end, for the character "H", upon detecting the colors of each LEDs 324 at the predetermined positions, the visible light signal can be decoded by assigning a value "1" to nth bit having the first color and assigning a value "0" to the nth bit having the second color to obtain the binary bit representation. This decoded binary bit representation can then be converted into the character "H". For example, the pre-assigning information may be stored in the storage module 176. The remaining characters "e", "l", "l", and "o" are encoded/decoded in the same manner as shown in FIG. 23B and thus will not be repeated for conciseness. By detecting the change in color of the latch indicator 2208, the decoding module 172 will understand that visible light signal detected belongs to the next character.

Figure 24A:
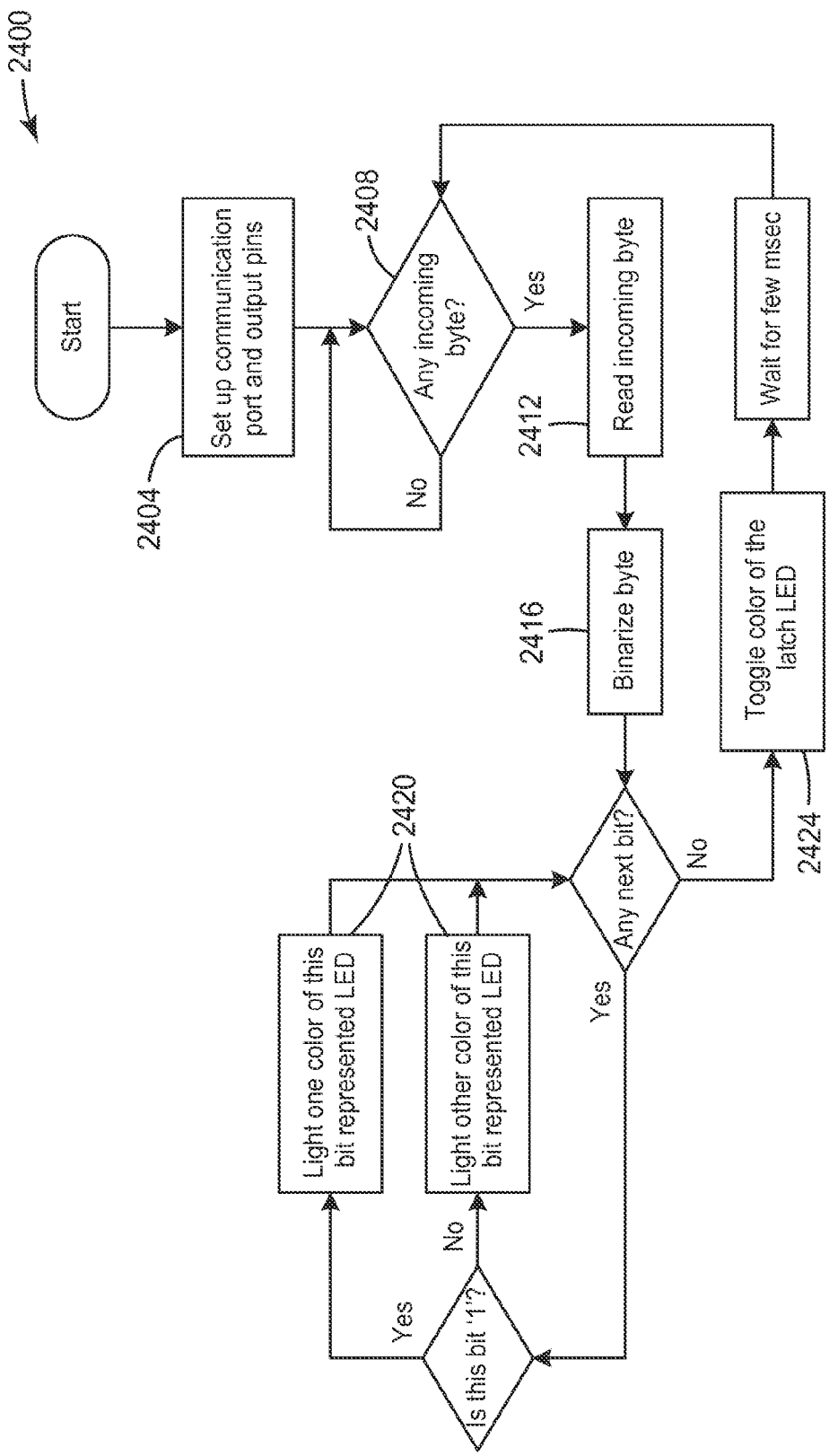
FIG. 24A illustrates an example flow diagram of a VLC transmission method according to the system shown in FIG. 22.

FIG. 24A illustrates a flow diagram of a VLC transmission method 2400 according to an example embodiment of the present invention. As a first step 2404, the computer device 308 is communicatively coupled to the processing module 316 for transmitting the data to the processing module 316 of the transmitter 304 for processing. For example, as shown in FIG. 22, the processing module 316 may be a microcontroller having inputs for receiving the data and outputs connected to the LEDs 324 for modulating the LEDs 324 based on the binarized data (i.e., binary bit representation). At step 2408, the processing module 316 listens/waits for incoming data in the form a series of bytes of data. Once an incoming byte is detected, the incoming byte is read at step 2412. The processing module 316 proceeds at step 2416 to binarize the received byte, and modulate each LED 324 at step 2420 to emit the first color (e.g., red to indicate the binary value "1") or the second color (e.g., blue to indicate the binary value "0") in the manner based on the binary bit representation of the byte as described hereinbefore. The latch indicator 2208 toggles between the first and second colors at step 2424 to indicate the next data. This modulated state of the LEDs 324 is then held for a predetermined short period of time (e.g., a few milliseconds) and returns to the step 2408 where the encoding module 316 listens/waits for the next incoming byte.

Figure 24B:
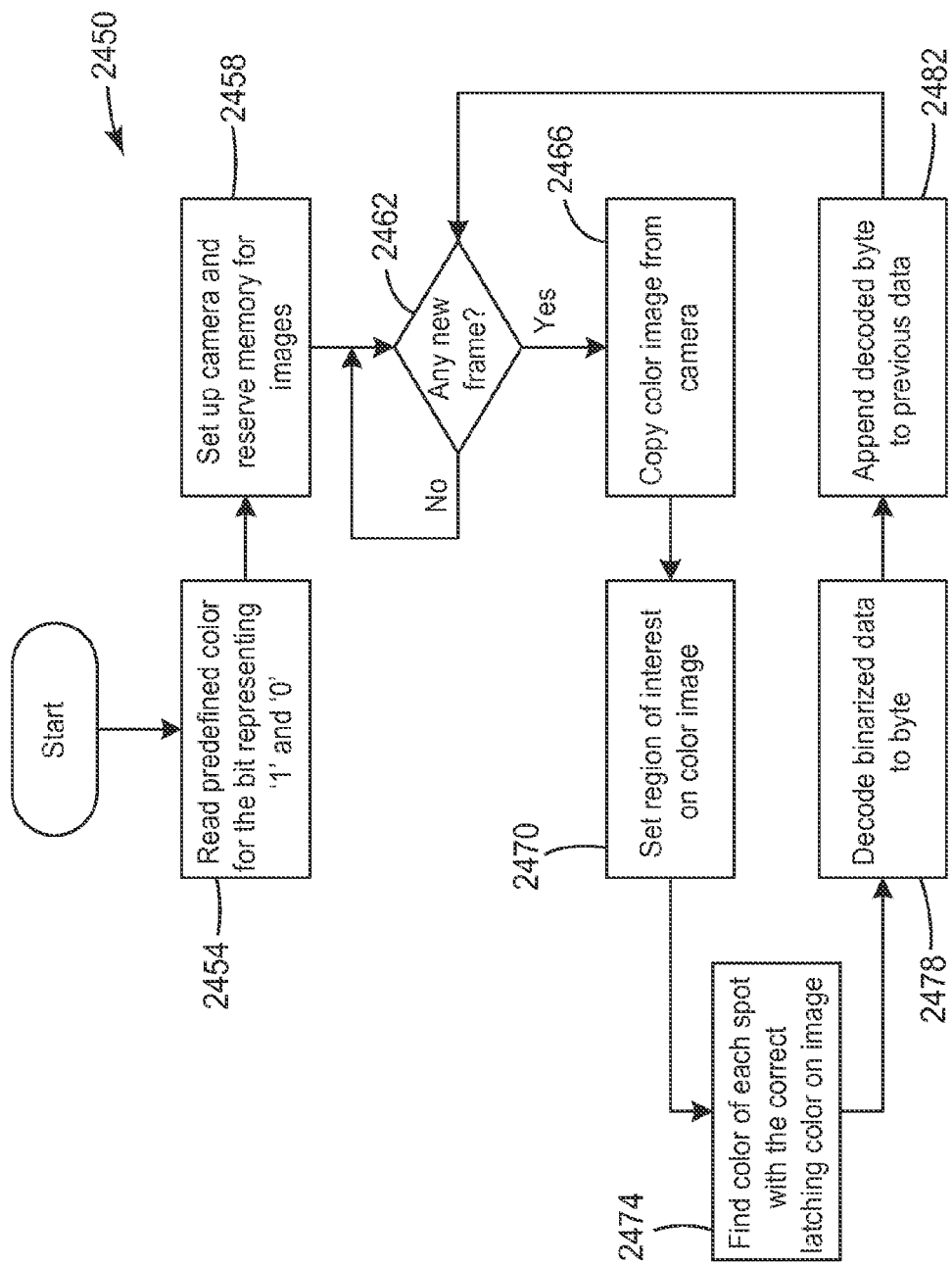
FIG. 24B illustrates an example flow diagram of a VLC receiving method according to the system shown in FIG. 22.

FIG. 24B illustrates a flow diagram of a VLC receiving method 2450 according to an example embodiment of the present invention. As a first step 2454, the pre-assigned or pre-defined information is read, e.g., from the storage module 176. Next at step 2458, the receiving module 158 (e.g., an image capture module) is initiated/set up to receive the visible light signal 150 and spaces in the storage module 176 (e.g., ROM and/or RAM memory) are allotted/reserved for storing the visible light signal 350. Then at step 2462, the decoding module 172 listens/waits for an incoming frame of the visible light signal 350 detected by the receiving module 158. Once a new frame is detected, the incoming frame is read from the receiving module 358 at step 2466 and a region of interest corresponding to the capture region 366 is set at step 2470 containing one or more light spots 362 detected. Then, the light spots 362 are identified/detected at step 2474 with the correct latching color and they are decoded at step 2478 by determining the value of the nth bit of the binary bit representation of the data based the presence of the color corresponding to the nth bit of the binary bit representation of the data as described hereinbefore. The decoded byte of data is then appended to any previously decoded byte at step 2482 if available/appropriate. Then, the receiving method 2450 returns to the step 2462 where the decoding module 316 listens/waits for the next frame from the receiving module 358.

Figure 25:
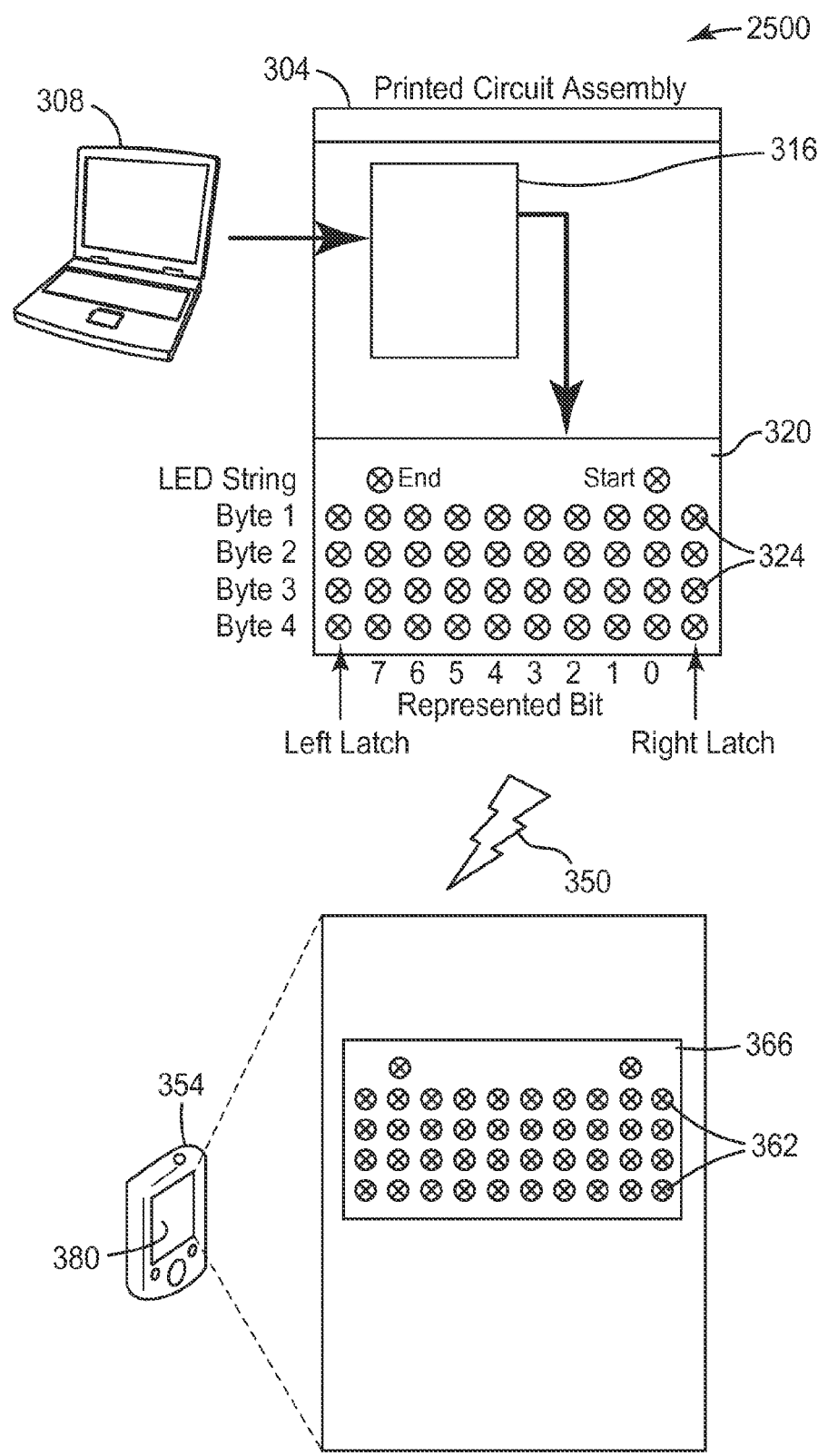
FIG. 25 depicts a schematic diagram generally illustrating a system for visible light communication according to an example embodiment of the present invention.

FIG. 25 depicts a schematic diagram generally illustrating a system 2500 for visible light communication according to an example embodiment of the present invention. The system 2500 is the same as the system 2200 as described with reference to FIG. 22, except that the system is capable of transmitting a plurality of bytes of data (e.g., 4 bytes) at once as illustrated in FIG. 25. Similar to FIG. 25, the arrangement/layout of the LEDs is also predetermined and the position of each LED 324 is pre-assigned to correspond to the respective nth bit of the binary bit representation such that each nth bit of the binary bit representation is represented by a unique position. It will be appreciated that the components/parts of the system 2500 the same as those in the system 2200 are indicated by the same reference numbers, and may have the same construction and same function, unless otherwise specified.

Figure 26:
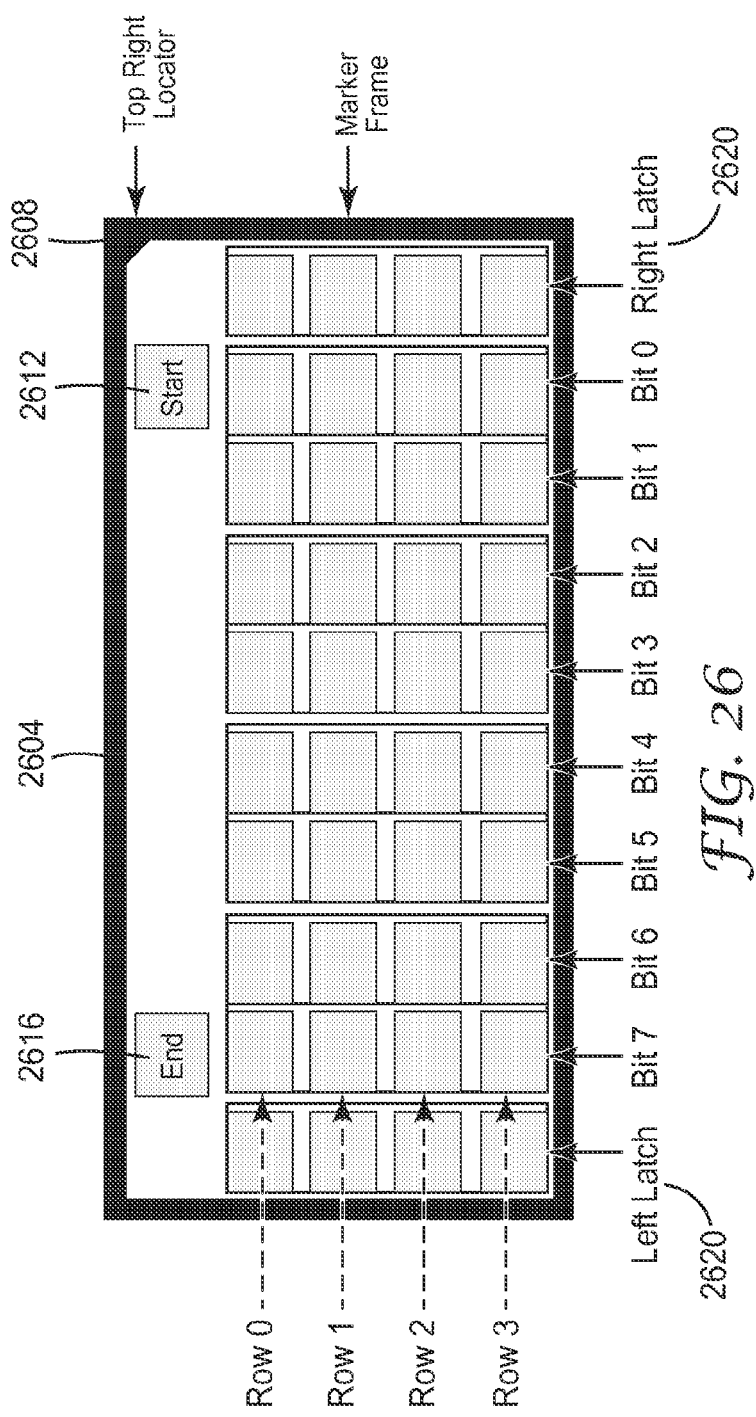
FIG. 26 illustrates an exemplary layout of the LEDs in the embodiment of FIG. 25.

FIG. 26 illustrates an exemplary layout of the LEDs 326. In this example embodiment, a marker frame 2604 is provided for indicating the area of interest in which the LEDs 324 are arranged. In addition, an orientation marker 2608 is provided for indicating the orientation of the marker frame 2604 in order to ensure the correct orientation may be identified. For example, the orientation marker 2608 may be positioned at the top right corner of the marker frame 2604. Furthermore, a start indicator 2612 and an end indicator 2616 may be provided for signaling the first and last frames of the data, respectively. In this example embodiment, each LED corresponding to the respective nth bit of the binary bit representation is turned ON when the nth bit has a value "1", and turned OFF when the nth bit has a value "0". Furthermore, as shown in FIG. 26, four rows of LEDs are provided, each row corresponding to a respective byte of data in the series of bytes of data. In addition, latch indicators 2620 are provided for indicating/signaling the transition to the next data or set of bytes. For example, left and right latch indicators 2620 may be provided as shown in FIG. 26 at the leftmost column and rightmost column, respectively, and configured to toggle between the ON and OFF states for signaling as summarised in Table 3 below.

TABLE 3

| Various states of the left and right latch indicators 2620 | | |
|---|---|---|
| Left Latch | Right Latch | Indication |
| Off | Off | No data |
| Off | On | Next data |
| On | Off | Next data |
| On | On | Repeat previous data |

For clarity and illustration purposes, FIG. 27 illustrates an example for transmitting the phrase "Hello, World!"

Figure 28A:
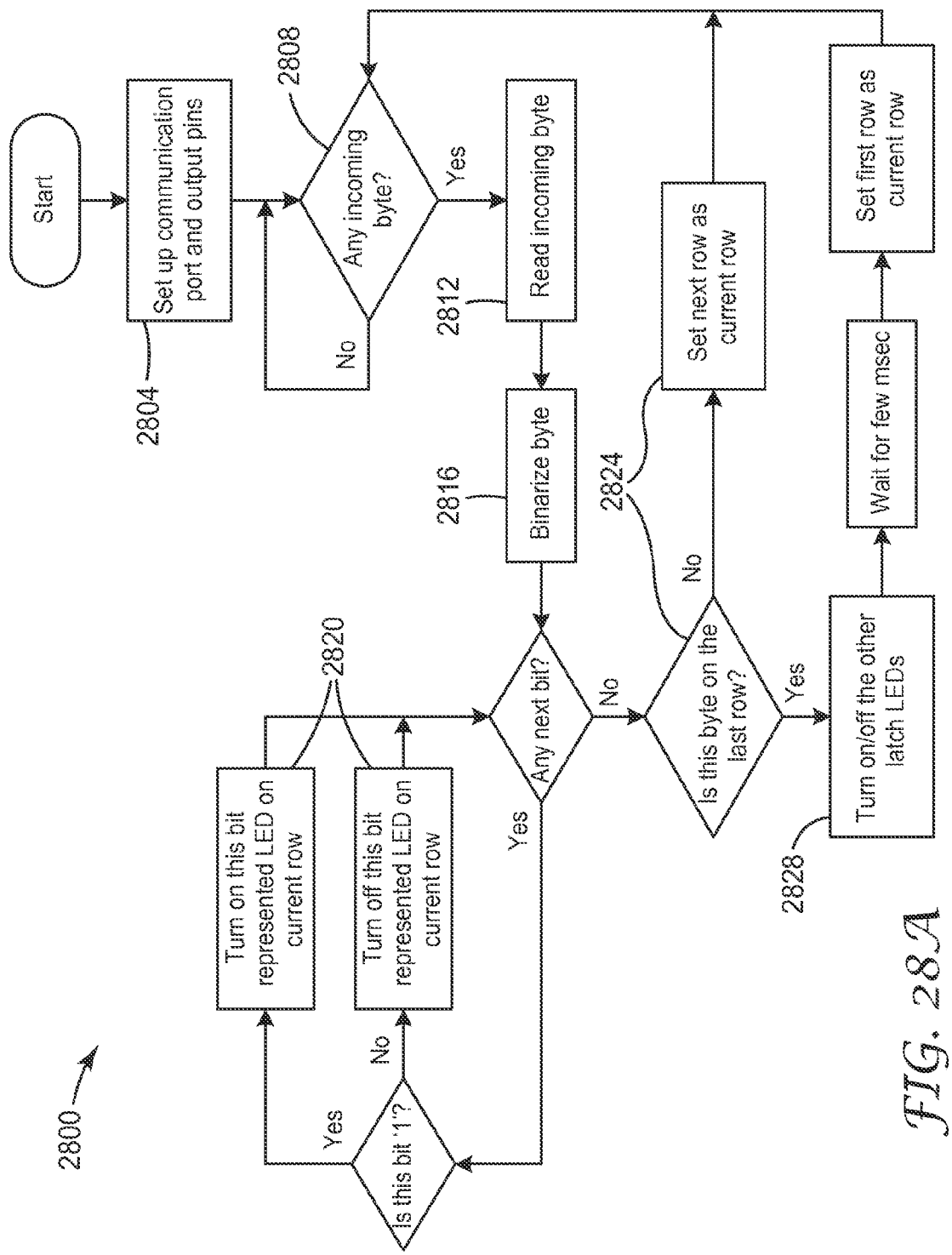
FIG. 28A illustrates an example flow diagram of a VLC transmission method according to the system shown in FIG. 25.

FIG. 28A illustrates a flow diagram of a VLC transmission method 2800 according to an example embodiment of the present invention. As a first step 2804, the computer device 308 is communicatively coupled to the processing module 316 for transmitting the data to the processing module 316 for processing. For example, as shown in FIG. 25, the processing module 316 may be a microcontroller having inputs for receiving the data and outputs connected to the LEDs 324 for modulating the LEDs 324 based on the binarized data. At step 2808, the processing module 316 listens/waits for incoming data in the form a series of bytes of data. Once an incoming byte is detected, the incoming byte is read at step 2812. The processing module 316 proceeds at step 2816 to binarize the received byte, and modulate each LED on the current row of LED 324 at step 2820 in the manner based on the binary bit representation of the byte as described hereinbefore. This continues until it reaches the last row of LED 324 at step 2824. The left and right latch LEDs turn on/off at step 2828 according to Table 3 to indicate the next data or no data. This modulated state of the LEDs 324 is then held for a predetermined short period of time (e.g., a few milliseconds) and returns to the step 2808 where the encoding module 316 listens/waits for the next incoming byte that to be shown on the first row of LED 324.

Figure 28B:
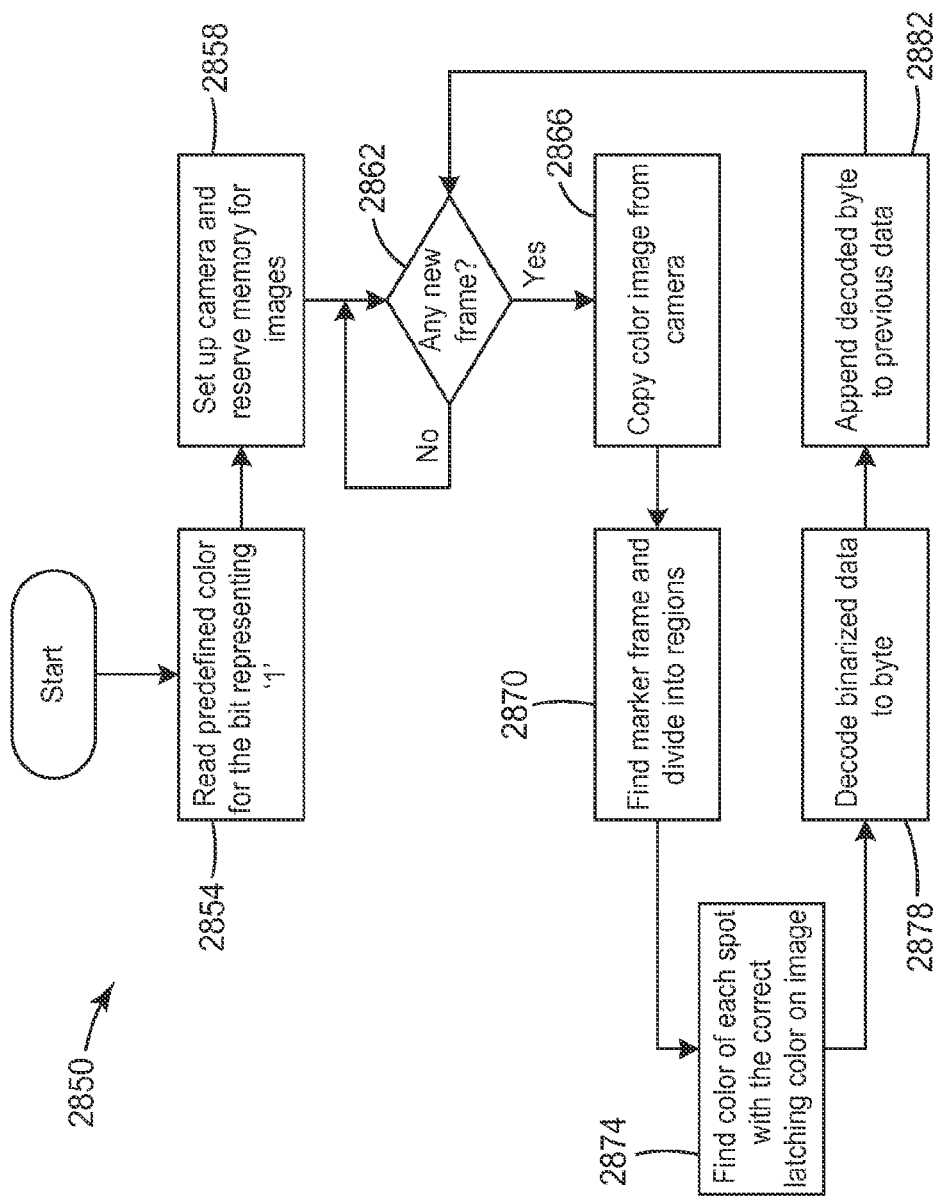
FIG. 28B illustrates an example flow diagram of a VLC receiving method according to the system shown in FIG. 25.

FIG. 28B illustrates a flow diagram of a VLC receiving method 2850 according to an example embodiment of the present invention. As a first step 2854, the pre-assigned or pre-defined information is read, e.g., from the storage module 176. Next at step 2858, the receiving module 158 (e.g., an image capture module) is initiated/set up to receive the visible light signal 150 and spaces in the storage module 176 (e.g., ROM and/or RAM memory) are allotted/reserved for storing the visible light signal 150. Then at step 2862, the decoding module 172 listens/waits for an incoming frame of the visible light signal 150 detected by the receiving module 158. Once a new frame is detected, the incoming frame is read from the receiving module 158 at step 2866 and the marker frame 2604 with orientation marker 2608 is searched within the capture region 366 at step 2870. Then, the light spots 362 are identified/detected at step 2874 with the correct latching color and they are decoded at step 2878 by determining the value of the nth bit of the binary bit representation of the data based the presence of the color corresponding to the nth bit of the binary bit representation of the data as described hereinbefore. The decoded byte of data is then appended to any previously decoded byte at step 2882 if appropriate. Then, the receiving method 2850 returns to the step 2862 where the decoding module 316 listens/waits for the next frame from the receiving module 158.

FIG. 29 illustrates a variation of the embodiment of FIG. 27 incorporating a byte shift verifying function. In particular, in this example embodiment, a new byte of data is displayed per frame instead of 4 new bytes of data per frame in the embodiment of FIG. 27. More specifically, the current byte of data is encoded by modulating one or more a first set of light emitting regions (e.g., LEDs) between a first state and a second state (e.g., ON or OFF states) based on the bit representation of the current data. Furthermore, at the same time, one or more second sets of light emitting regions within the capture region are modulated between a first state and a second state based on the bit representations of one or more previous data for enabling error detection. In particular, since each byte of data is shifted (e.g., either down or up) on every frame, the current decoded byte can verify with the previously decoded byte of data to ensure data correctness and consistency. As there are four rows of data in this example, each byte of data appears four times and can therefore be verified three times with the previously decoded byte of data.

For clarity and illustration purposes, FIG. 29 illustrates an example for transmitting the word "Hello".

Figure 30A:
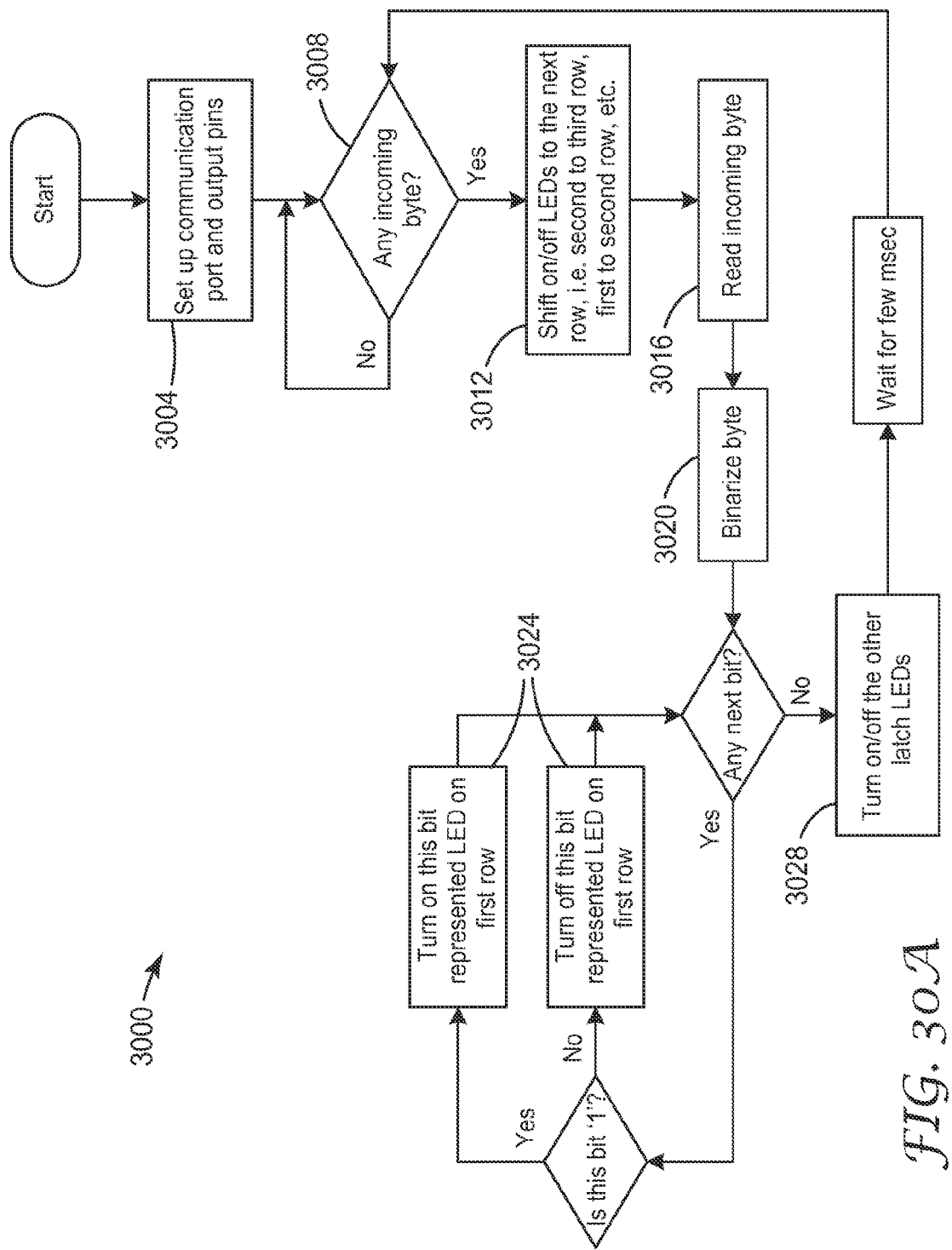
FIG. 30A illustrates an example flow diagram of a VLC transmission method according to the embodiment of FIG. 29.

FIG. 30A illustrates a flow diagram of a VLC transmission method 3000 according to an example embodiment of the present invention. As a first step 3004, the computer device 308 is communicatively coupled to the processing module 316 for transmitting the data to the processing module 316 for processing. For example, as shown in FIG. 25, the processing module 316 may be a microcontroller having inputs for receiving the data and outputs connected to the LEDs 324 for modulating the LEDs 324 based on the binarized data. At step 3008, the processing module 316 listens/waits for incoming data in the form a series of bytes of data. Once an incoming byte is detected, the rows of turned on/off LEDs are shifted to the next rows, that is third to fourth row, second to third row, and first to second row at step 3012, and the incoming byte is read at step 3016. The processing module 316 proceeds at step 3020 to binarize the received byte, and modulate each LED on the first row of LED 324 at step 3024 in the manner based on the binary bit representation of the byte as described hereinbefore. The left and right latch LEDs turn on/off at step 3028 according to Table 3 to indicate the next data or no data. This modulated state of the LEDs 324 is then held for a predetermined short period of time (e.g., a few milliseconds) and returns to the step 3008 where the encoding module 316 listens/waits for the next incoming byte.

Figure 30B:
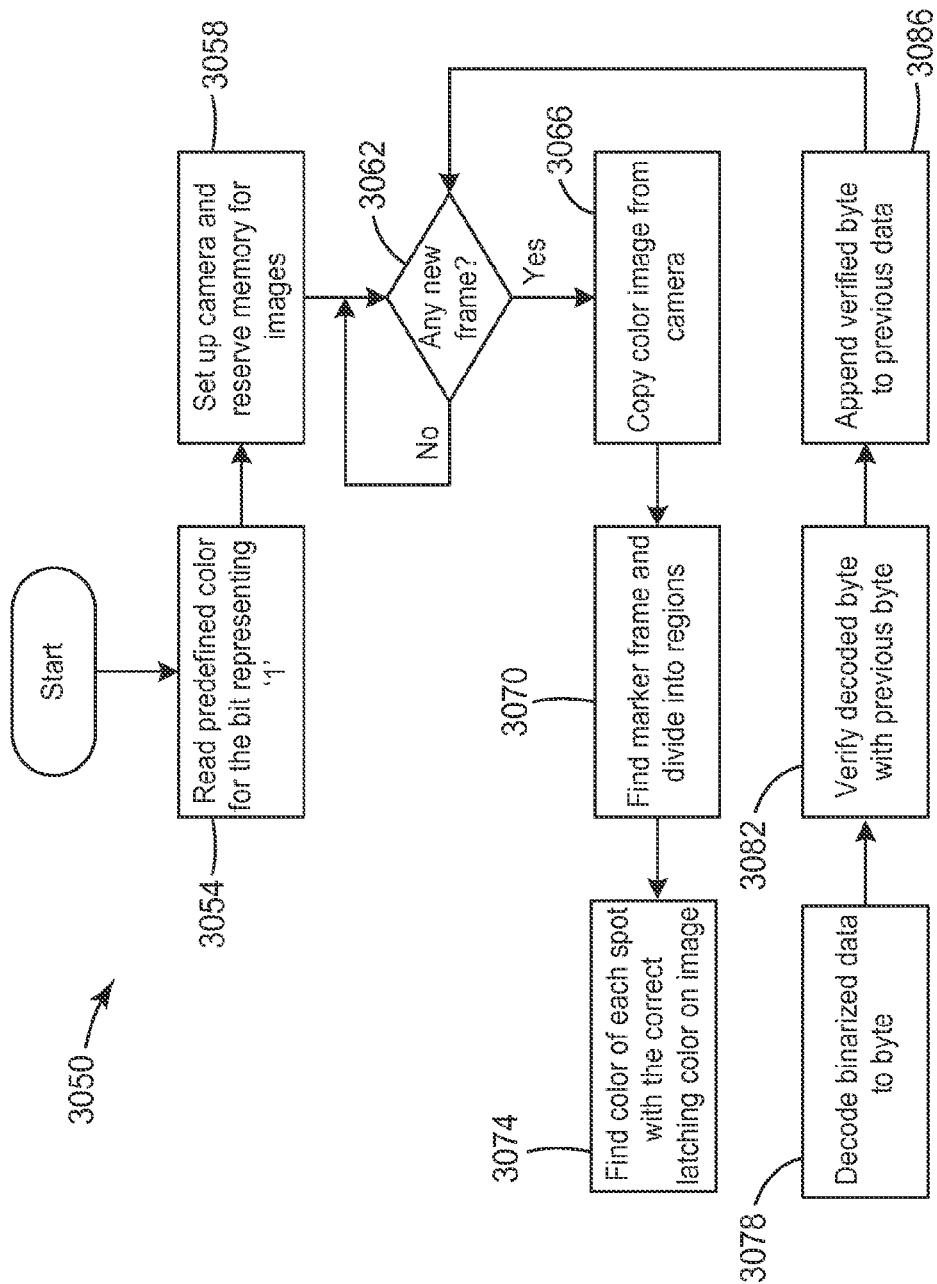
FIG. 30B illustrates an example flow diagram of a VLC receiving method according to the embodiment of FIG. 29.

FIG. 30B illustrates a flow diagram of a VLC receiving method 3050 according to an example embodiment of the present invention. As a first step 3054, the pre-assigned or pre-defined information is read, e.g., from the storage module 176. Next at step 3058, the receiving module 158 (e.g., an image capture module) is initiated/set up to receive the visible light signal 150 and spaces in the storage module 176 (e.g., ROM and/or RAM memory) are allotted/reserved for storing the visible light signal 150. Then at step 3062, the decoding module 172 listens/waits for an incoming frame of the visible light signal 150 detected by the receiving module 158. Once a new frame is detected, the incoming frame is read from the receiving module 158 at step 3066 and the marker frame 2604 with orientation marker 2608 is searched within the capture region 366 at step 3070. Then, the light spots 362 are identified/detected at step 3074 with the correct latching color and they are decoded at step 3078 by determining the value of the nth bit of the binary bit representation of the data based the presence of the color corresponding to the nth bit of the binary bit representation of the data as described hereinbefore. The decoded byte of data is verified with any previously decoded byte at step 3082 for error detecting purpose and is then appended to any previously decoded byte at step 3086 if available/appropriate. Then, the receiving method 3050 returns to the step 3062 where the decoding module 316 listens/waits for the next frame from the receiving module 158.

Figure 31:
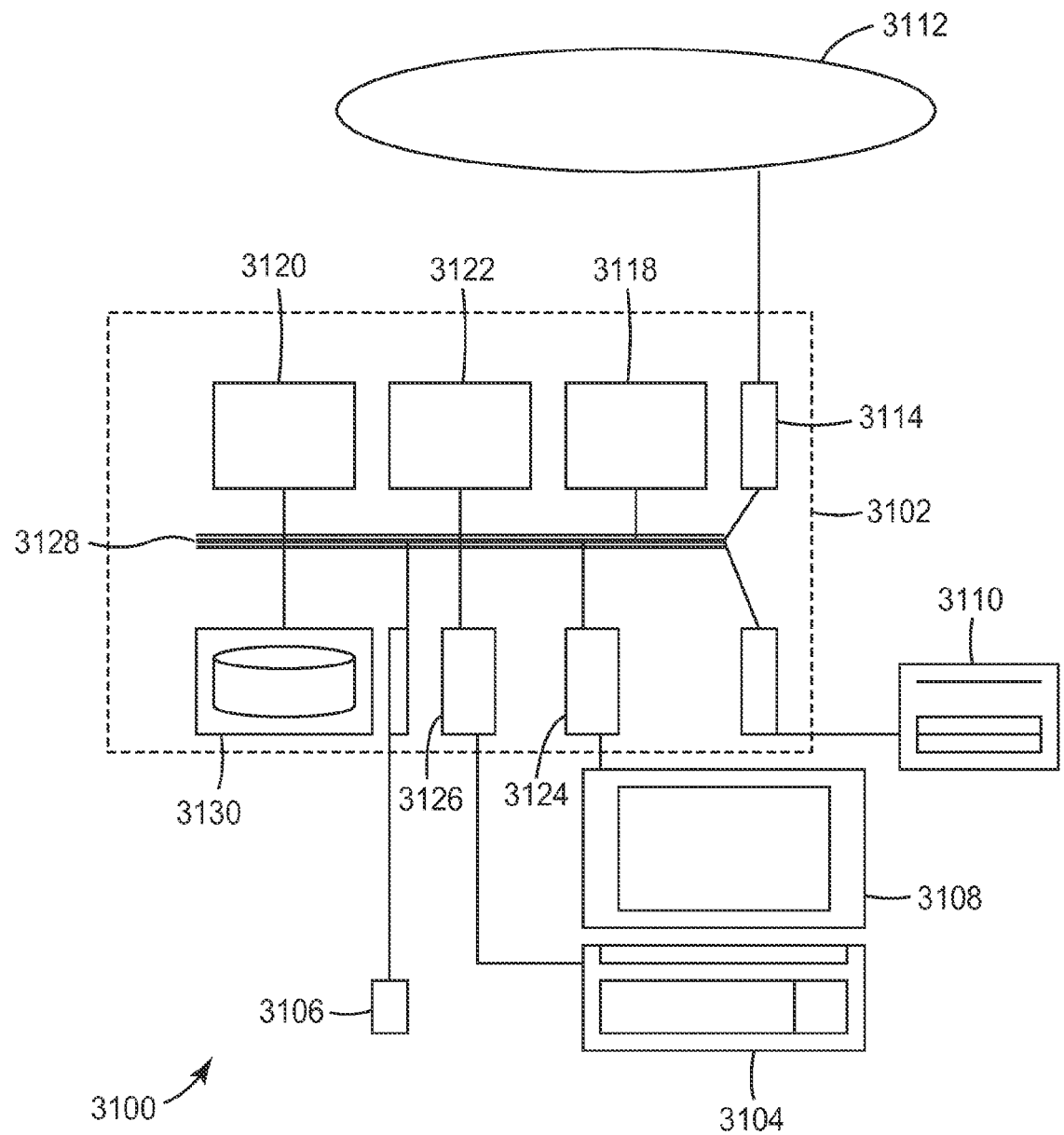
FIG. 31 depicts an exemplary conventional general purpose computer.

It will be appreciated that the methods of the example embodiments described herein can be implemented on a computer system 3100, for example, schematically shown in FIG. 31. The method may be implemented as software, such as a computer program being executed within the computer system 3100, and instructing the computer system 3100 to conduct the method of the example embodiment.

The computer system 3100 comprises a computer module 3102, input modules such as a keyboard 3104 and mouse 3106 and a plurality of output devices such as a display 3108, and printer 3110.

The computer module 3102 is connected to a computer network 3112 via a suitable transceiver device 3114, to enable access to e.g. the Internet or other network systems such as Local Area Network (LAN) or Wide Area Network (WAN).

The computer module 3102 in the example includes a processor 3118, a Random Access Memory (RAM) 3120 and a Read Only Memory (ROM) 3122. The computer module 3102 also includes a number of Input/Output (I/O) interfaces, for example I/O interface 3124 to the display 3108, and I/O interface 3126 to the keyboard 3104. The components of the computer module 3102 typically communicate via an interconnected bus 3128 and in a manner known to the person skilled in the relevant art.

The application program is typically supplied to the user of the computer system 3100 encoded on a data storage medium such as a CD-ROM or flash memory carrier and read utilising a corresponding data storage medium drive of a data storage device 3130. The application program is read and controlled in its execution by the processor 3118. Intermediate storage of program data may be accomplished using RAM 3120.

Figure 32:
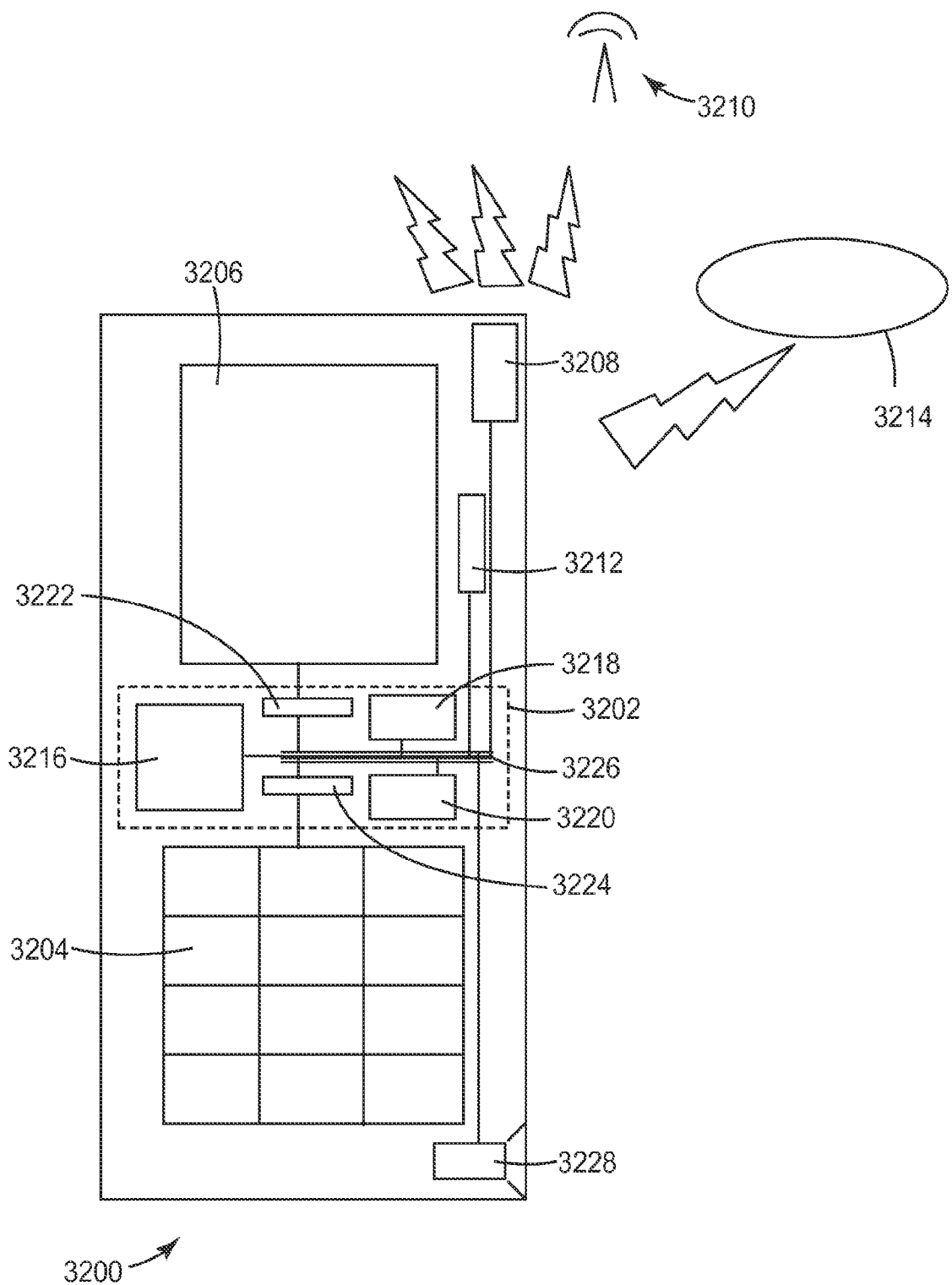
FIG. 32 depicts an exemplary conventional communication device.

An example embodiment can be implemented on a communication device 3200, schematically shown in FIG. 32. It may be implemented as software, such as a computer program being executed within the communication device 3200, and instructing the communication device 3200 to conduct a method of the example embodiment.

The communication device 3200 comprises a processor module 3202, an input module such as a keypad 3204 and an output module such as a display 3206. The processor module 3202 is coupled to a first communication unit 3208 for communication with a cellular network 3210. The first communication unit 3208 can include but is not limited to a subscriber identity module (SIM) card loading bay. The cellular network 3210 can, for example, be a 3G network.

The processor module 3202 is further coupled to a second communication unit 3212 for connection to a local area network 3214. For example, the connection can enable wired/wireless communication and/or access to e.g. the Internet or other network systems such as Local Area Network (LAN), Wireless Personal Area Network (WPAN) or Wide Area Network (WAN). The second communication unit 3212 can include but is not limited to a wireless network card or an Ethernet network cable port. The processor module 3202 in the example includes a processor 3216, a Random Access Memory (RAM) 3218 and a Read Only Memory (ROM) 3220. The processor module 3202 also includes a number of Input/Output (I/O) interfaces, for example I/O interface 3222 to the display 3206, and I/O interface 3224 to the keypad 3204. The components of the processor module 3202 typically communicate via an interconnected bus 3226 and in a manner known to the person skilled in the relevant art.

The application program is typically supplied to the user of the communication device 3200 encoded on a data storage medium such as a flash memory module or memory card/stick and read utilising a corresponding memory reader-writer of a data storage device 3228. The application program is read and controlled in its execution by the processor 3216. Intermediate storage of program data may be accomplished using RAM 3218.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An apparatus for receiving a visible light signal in visible light communication, comprising:
   a receiving module for receiving the visible light signal in the form of a plurality of light spots within a capture region respectively corresponding to light emitted by one or more of a plurality of light emitting regions modulated between a first state and a second state based on a binary bit representation of data;
   a decoding module for decoding the visible light signal into the binary bit representation corresponding to the data based on the plurality of light spots received; and
   at least one stored reference matrix comprising a predetermined array of binary bit representations;
   wherein the plurality of light spots appear within the capture region without being restricted to predetermined locations in the capture region for the visible light signal to be decodable to obtain the data; and
   wherein the decoding module is configured to utilize the plurality of light spots to determine a coordinate in the at least one stored reference matrix matching the binary bit representation of the data.

2. The apparatus according to claim 1, wherein the decoding module is configured to detect a color of each light spot of the plurality of light spots received by the receiving module, and to determine a value of a nth bit of the binary bit representation based on presence of a color corresponding to the nth bit of the binary bit representation.

3. The apparatus according to claim 1, wherein said data is a byte of data, and the decoding module is configured to sequentially decode the visible light signal one byte of data at a time.

4. The apparatus of claim 1, wherein:
   the at least one stored reference matrix comprises a plurality of available reference matrices based on which the visible light signal can be decoded; and
   the decoding module is configured to select a reference matrix for decoding the visible light signal based on one or more light spots of the plurality of light spots received.

5. The apparatus of claim 4, wherein each available reference matrix of the plurality of available reference matrices is associated with one or more unique colors, and the reference matrix selected for decoding the visible light signal has associated therewith said one or more unique colors that match one or more colors of the one or more light spots of the plurality of light spots received.

6. A method of receiving a visible light signal in visible light communication, comprising:
   receiving the visible light signal in the form of a first set of one or more light spots within a capture region respectively corresponding to light emitted by a first set of light emitting regions modulated between a first state and a second state based on a binary bit representation of a current data transmitted; and
   decoding the visible light signal into the binary bit representation corresponding to the current data based on the first set of one or more light spots received,
   wherein light spots of the first set of one or more light spots appear at predetermined locations within the capture region, and
   the visible light signal further comprises one or more second sets of one or more light spots within the capture region respectively corresponding to light emitted by one or more second sets of light emitting regions modulated between a first state and a second state based on binary bit representations of one or more previous data for enabling error detection.

7. The method according to claim 6, wherein the visible light signal further comprises a third set of one or more light spots, corresponding to light emitted by a third set of modulated light emitting regions, appearing at predetermined locations in the capture region for signalling transmission of a next data.

8. The method according to claim 7, wherein light spots of the first set of one or more light spots are configured to appear in a first row in the capture region, the one or more second sets of one or more light spots are configured to appear in one or more second rows in the capture region, and the third set of one or more light spots are configured to appear in first and second columns in the capture region, wherein the third set of one or more light spots are configured to toggle between the first and second columns for signalling the transmission of the next data.

9. The method according to claim 6, wherein the current data is a byte of data and one or more previous data are one or more previous consecutive bytes of data.

10. The method according to claim 6, wherein said decoding comprises detecting a color of each light spot of the first set of one or more light spots received by a receiving module, and determining a value of a nth bit of the binary bit representation based on presence of a color corresponding to the nth bit of the binary bit representation.

11. The method according to claim 6, further comprising:
   storing at least one reference matrix comprising a predetermined array of binary bit representations; and
   utilizing the first set of one or more light spots to determine a coordinate in the at least one reference matrix matching the binary bit representation of the current data.

12. The method of claim 11, wherein said storing of the at least one reference matrix comprises storing a plurality of available reference matrices based on which the visible light signal can be decoded, and the method further comprises selecting a reference matrix for decoding the visible light signal based on one or more colors of the first set of one or more light spots received.

13. An apparatus for receiving a visible light signal in visible light communication, comprising:
   a receiving module for receiving the visible light signal in the form of a first set of one or more light spots within a capture region respectively corresponding to light emitted by a first set of light emitting regions modulated between a first state and a second state based on a binary bit representation of a current data transmitted; and a decoding module for decoding the visible light signal into the binary bit representation corresponding to the current data based on the first set of one or more light spots received, wherein the first set of one or more light spots appear at predetermined locations within the capture region, and the visible light signal further comprises one or more second sets of one or more light spots within the capture region respectively corresponding to light emitted by one or more second sets of light emitting regions modulated between a first state and a second state based on binary bit representations of one or more previous data for enabling error detection.

14. The apparatus according to claim 13, wherein the visible light signal further comprises a third set of one or more light spots, corresponding to light emitted by a third set of modulated light emitting regions, appearing at predetermined locations in the capture region for signalling transmission of a next data.

15. The apparatus according to claim 14, wherein light spots of the first set of one or more light spots are configured to appear in a first row in the capture region, the one or more second sets of one or more light spots are configured to appear in one or more second rows in the capture region, and the third set of one or more light spots are configured to appear in first and second columns in the capture region, wherein the third set of one or more light spots are configured to toggle between the first and second columns for signalling the transmission of the next data.

16. The apparatus according to claim 13, wherein the decoding module is configured to detect a color of each light spot of the first set of one or more light spots received by the receiving module, and determine a value of a nth bit of the binary bit representation based on presence of a color corresponding to the nth bit of the binary bit representation.

17. The apparatus according to claim 13, wherein said current data is a byte of data, and the decoding module is configured to sequentially decode the visible light signal one byte of data at a time.

18. The apparatus according to claim 13, wherein:
the first set of one or more light spots received comprises a plurality of light spots;
the apparatus comprises at least one stored reference matrix comprising a predetermined array of binary bit representations; and
the decoding module is configured to utilize the plurality of light spots to determine a coordinate in the at least one stored reference matrix matching the binary bit representation of the current data.

19. The apparatus of claim 18, wherein:
the at least one stored reference matrix comprises a plurality of available reference matrices based on which the visible light signal can be decoded; and
the decoding module is configured to select a reference matrix for decoding the visible light signal based on the first set of one or more light spots received.

* * * * *